(12) United States Patent
Ishi et al.

(10) Patent No.: US 12,741,326 B2
(45) Date of Patent: Sep. 22, 2026

(54) CUTTING TOOL AND METHOD FOR MANUFACTURING MACHINED PRODUCT

(71) Applicant: KYOCERA CORPORATION, Kyoto (JP)

(72) Inventors: Hirohisa Ishi, Moriyama (JP); Hirokazu Hatano, Otsu (JP)

(73) Assignee: KYOCERA CORPORATION, Kyoto (JP)

( * ) Notice: Subject to any disclaimer, the term of this patent is extended or adjusted under 35 U.S.C. 154(b) by 349 days.

(21) Appl. No.: 18/574,313

(22) PCT Filed: Aug. 23, 2022

(86) PCT No.: PCT/JP2022/031751
§ 371 (c)(1),
(2) Date: Dec. 27, 2023

(87) PCT Pub. No.: WO2023/032761
PCT Pub. Date: Mar. 9, 2023

(65) Prior Publication Data
US 2024/0286207 A1 Aug. 29, 2024

(30) Foreign Application Priority Data
Sep. 1, 2021 (JP) ................................ 2021-142555

(51) Int. Cl.
*B23C 5/06* (2006.01)
*B23C 5/22* (2006.01)
*B23C 5/24* (2006.01)

(52) U.S. Cl.
CPC .............. *B23C 5/06* (2013.01); *B23C 5/2204* (2013.01); *B23C 5/2226* (2013.01); *B23C 5/2475* (2013.01); *B23C 2220/28* (2013.01)

(58) Field of Classification Search
CPC ....... B23C 5/06; B23C 5/2204; B23C 5/2226; B23C 5/2475; B23C 2220/28
See application file for complete search history.

(56) References Cited

U.S. PATENT DOCUMENTS 3,343,431 A * 9/1967 Boyer ................ B23B 29/0341 407/104
3,805,351 A * 4/1974 Mayer ................ B23B 27/1681 407/104
(Continued)

FOREIGN PATENT DOCUMENTS

EP 3009216 A1 4/2016
JP 2005-111651 A 4/2005
(Continued)

*Primary Examiner* — Ryan J. Walters
(74) *Attorney, Agent, or Firm* — HAUPTMAN HAM, LLP

(57) ABSTRACT

A cutting tool in an embodiment of the present disclosure includes a body which extends from a front end toward a rear end along a rotation axis and includes a pocket, a cutting part located in the pocket, and an elastic body which is located between the body and the cutting part and applies an urging force in a direction toward the rear end to the cutting part. The pocket includes a first seating surface directed to a front side in a rotation direction of the rotation axis. The cutting part includes a rear surface which is located on a rear side in the rotation direction of the rotation axis and which is in contact with the first seating surface. The elastic body is in contact with the first seating surface and the rear surface. The rear surface is slidable toward the rear end.

11 Claims, 32 Drawing Sheets

(56) References Cited

U.S. PATENT DOCUMENTS

| | | | | | |
|---|---|---|---|---|---|
| 3,856,427 | A * | 12/1974 | Lovendahl | B23B 29/0341 | 408/239 R |
| 4,188,162 | A * | 2/1980 | Zweekly | B23B 27/1614 | 408/239 R |
| 4,197,042 | A * | 4/1980 | Krhounek | B23B 27/1622 | 407/104 |
| 4,600,341 | A * | 7/1986 | Board | B23B 27/1677 | 407/112 |
| 5,921,720 | A * | 7/1999 | Lemke | B23C 5/1045 | 407/42 |
| 6,203,251 | B1 * | 3/2001 | Oppelt | B23C 5/2213 | 407/51 |
| 8,858,126 | B2 * | 10/2014 | Morrison | B23C 5/2213 | 407/34 |
| 9,623,493 | B2 * | 4/2017 | Morrison | B23C 5/1045 | |
| 9,862,040 | B2 * | 1/2018 | Kocherovsky | B23C 5/2226 | |
| 2014/0212229 | A1 | 7/2014 | Diepold | | |

FOREIGN PATENT DOCUMENTS

| | | | |
|---|---|---|---|
| JP | 2010-149231 | A | 7/2010 |
| WO | 2004080633 | A1 | 9/2004 |
| WO | 2013029072 | A1 | 3/2013 |

* cited by examiner

CUTTING TOOL AND METHOD FOR MANUFACTURING MACHINED PRODUCT

This application is a national stage entry according to 35 U.S.C. 371 of PCT Application No. PCT/JP2022/031751 filed Aug. 23, 2022, which claims priority to Japanese Patent Application No. 2021-142555, filed Sep. 1, 2021. The contents of this application are incorporated herein by reference in their entirety.

CROSS-REFERENCE TO RELATED APPLICATION

The present application claims priority to Japanese Patent Application No. 2021-142555, filed Sep. 1, 2021. The contents of this application are incorporated herein by reference in their entirety.

TECHNICAL FIELD

The present disclosure relates to a cutting tool and a method for manufacturing a machined product. Examples of the cutting tool may include a so-called milling tool (a milling cutter). The milling tool is usable for milling processes, such as face milling and end milling.

BACKGROUND

As a cutting tool, milling tools have been known which are discussed in, for example, WO 2013/029072 (Patent Document 1), WO 2004/080633 (Patent Document 2), and Japanese Unexamined Patent Publication No. 2005-111651 (Patent Document 3). In general, in cases where face milling is carried out using the milling tool, a crossed line pattern might occur on a machined surface of a workpiece because a cutting edge comes into contact with the workpiece on a rear side in a feed direction.

A rotation axis of the milling tool is inclined toward a front side in the feed direction in the milling tools discussed in Patent Documents 1 and 2. This avoids a risk of causing the crossed line pattern on the machined surface of the workpiece. A clearance with respect to a wiper cutting edge in a direction along the rotation axis is imparted to a flank part in the milling tool discussed in Patent Document 3. This avoids the risk of causing the crossed line pattern on the machined surface of the workpiece due to the flank part.

As discussed in Patent Documents 1 and 2, it is possible to tilt the rotation axis toward the front side in the feed direction in a machine whose machining direction is limited to a single axis as in a general-purpose milling cutter. However, it is difficult to apply this to a general machining center, etc. whose machining direction is one or more axes. That is, the milling tools discussed in Patent Documents 1 and 2 lack versatility.

The wiper cutting edge located on the front side in the feed direction and the wiper cutting edge located on the rear side in the feed direction are identical in position along the rotation axis in the milling tool discussed in Patent Document 3. Therefore, the risk of crossed line pattern due to the flank part can be avoided, but the risk of the crossed line pattern due to the wiper cutting edges cannot be avoided.

SUMMARY

A cutting tool in an embodiment of the present disclosure includes a body, a cutting part, and an elastic body. The body extends from a front end toward a rear end along a rotation axis, and includes a pocket located on a side of the front end. The cutting part is located in the pocket and includes a cutting edge located on a side of the front end. The elastic body is located between the body and the cutting part, and applies an urging force in a direction toward the rear end to the cutting part. The pocket includes a first seating surface directed to a front side in a rotation direction of the rotation axis. The cutting part includes a rear surface which is located on a rear side in the rotation direction of the rotation axis and which is in contact with the first seating surface. The elastic body is in contact with the first seating surface and the rear surface. The rear surface is slidable toward the rear end.

EMBODIMENTS

Figure 1:
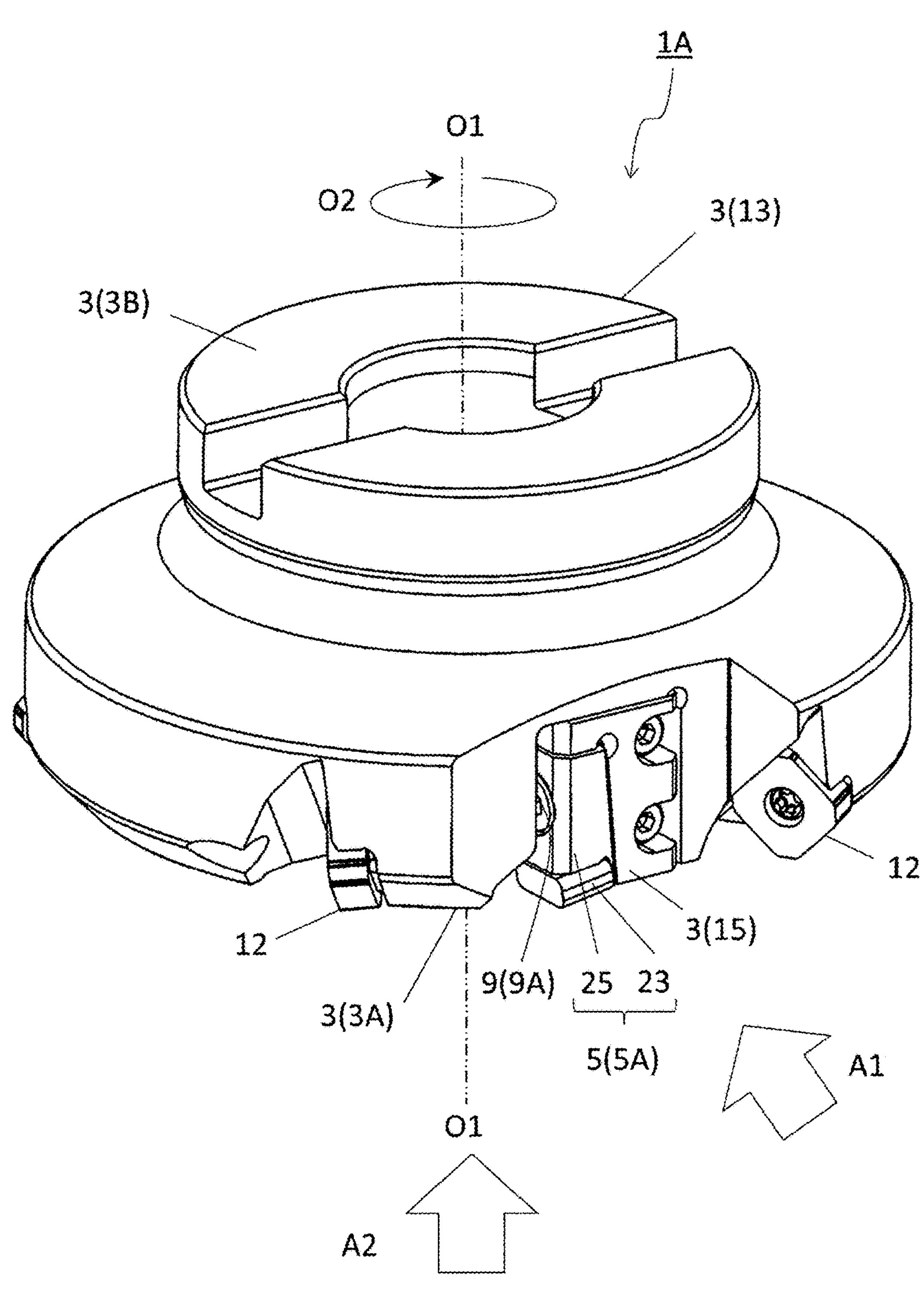
FIG. 1 is a perspective view illustrating a cutting tool in a first embodiment.

Cutting tools in non-limiting first to fourth embodiments of the present disclosure are described in detail below with reference to the drawings. For convenience of description, the drawings referred to in the following illustrate, in simplified form, only main members necessary for describing the embodiments. The cutting tools of the present disclosure may therefore include any arbitrary structural member not illustrated in the drawings referred to. Dimensions of the members in each of the drawings faithfully represent neither dimensions of actual structural members nor dimensional ratios of these members. In a machining process, the term “during machining” means a state where the cutting tool and a workpiece are in contact with each other, and the term “during non-machining” means a state where the cutting tool and the workpiece are not in contact with each other. Unless otherwise noted, the drawings illustrate the state of the cutting tool during non-machining.

The cutting tool 1A in the first embodiment includes a rotation axis O1 and is a so-called rotary tool as in a non-limiting embodiment illustrated in FIG. 1. Examples of the rotary tool may include milling cutters and end mills. The rotary tool in the non-limiting embodiment illustrated in FIG. 1 is a milling cutter. The rotation axis O1 is an axis during rotation of the cutting tool 1A, and is not included in the cutting tool 1A (body 3) as a concrete object.

The cutting tool 1A includes a body 3, a cutting part 5 and an elastic body 7 as in the non-limiting embodiment illustrated in FIG. 1, etc. The body 3 extends from a front end 3A to a rear end 3B along the rotation axis O1. The body 3 includes a pocket 9 located on a side of the front end 3A. The cutting part 5 is located in the pocket 9 and includes a cutting edge 11 located on a side of the front end 3A (refer to FIG. 4, etc.). The elastic body 7 is located between the body 3 and the cutting part 5 (refer to FIG. 10, etc.).

Figure 3:
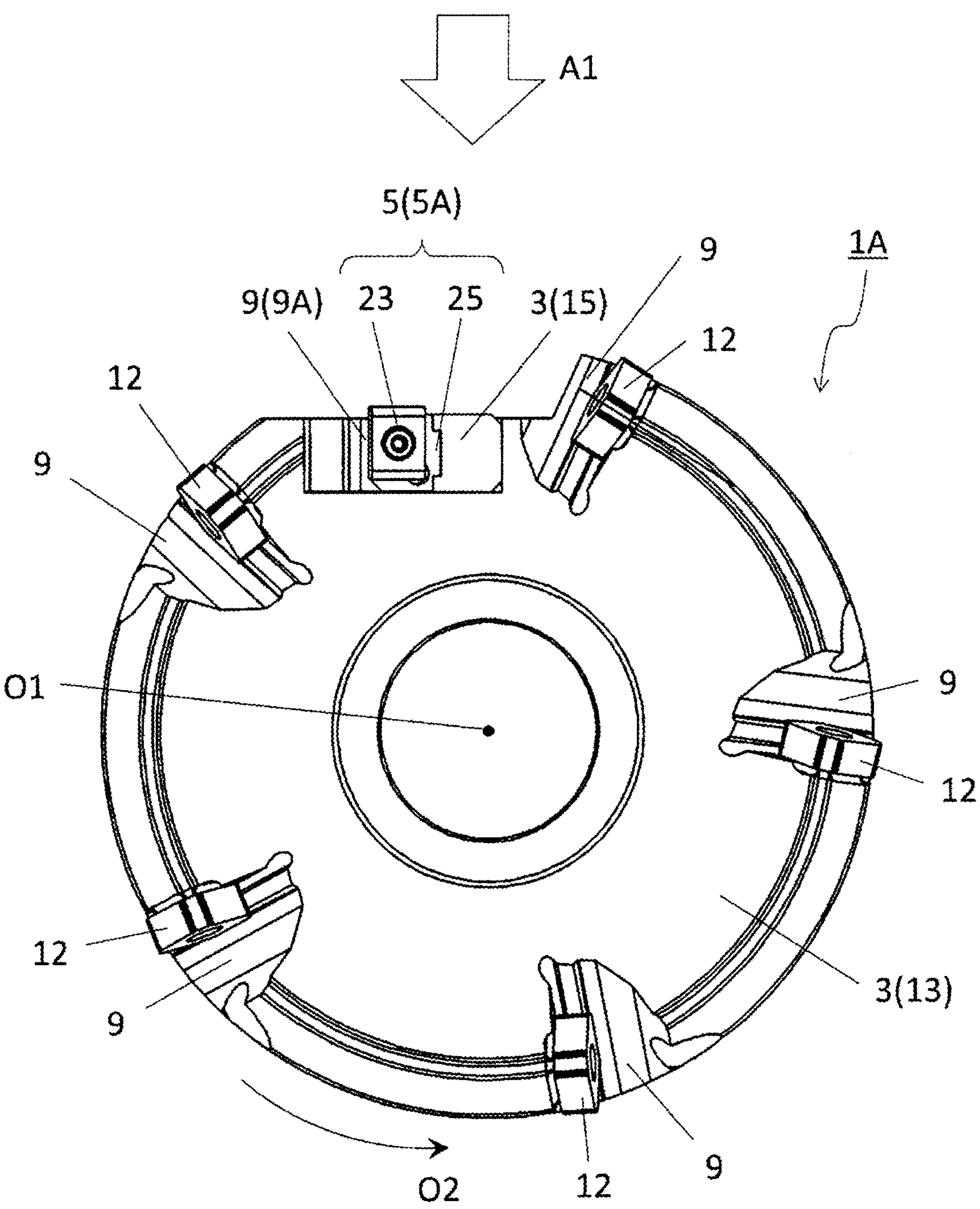
FIG. 3 is a plan view of the cutting tool illustrated in FIG. 1 as viewed from A2 direction.

The body 3 is the part that becomes a base of the cutting tool 1A. The pocket 9 may open into an outer peripheral surface of the body 3 and an end surface on a side of the front end 3A. There may be only one pocket 9, or there may be a plurality of pockets 9 as in a non-limiting embodiment illustrated in FIG. 3. FIG. 3 is the drawing of the cutting tool 1A illustrated in FIG. 1 as viewed from A2 direction (as viewed from a side of the front end 3A). If the body 3 includes the plurality of pockets 9, one of the plurality of pockets 9 is a first pocket 9A. There may be a plurality of cutting parts 5 instead of including only one cutting part 5 as illustrated in FIG. 1. If the cutting tool 1A includes the plurality of pockets 9, the cutting part 5 located in the first pocket 9A is a first cutting part 5A.

An insert may be attached to each of the pockets. A cutting insert 12 may be attached as the insert to each of the plurality of pockets other than the first pocket 9A as in the non-limiting embodiment illustrated in FIG. 1. There may be one or a plurality of elastic bodies 7. If the cutting tool 1A includes the plurality of elastic bodies 7, the elastic body 7 located between the body 3 and the first cutting part 5A is a first elastic body 7A.

A rotation direction O2 is not limited to a clockwise direction illustrated in FIG. 1. For example, in cases where the cutting tool 1A is configured to be reversed around the rotation axis O1 with respect to the configuration illustrated in FIG. 1, the rotation direction O2 may be counterclockwise.

The cutting tool 1A of the first embodiment has a columnar shape extending along the rotation axis O1 from the front end 3A toward the rear end 3B in the non-limiting embodiment illustrated in FIG. 1. For the convenience of description, a portion located on the side of the front end 3A and a portion located on the side of the rear end 3B in the body 3 may be respectively a first end 3A and a second end 3B in some cases. As is apparent from the fact that the cutting tool 1A includes the first pocket 9A, etc., the cutting tool 1A is not a strict columnar shape. A length of the body 3 in a direction along the rotation axis O1 is, for example, 50-100 mm. An outer diameter of the body 3 in a direction orthogonal to the rotation axis O1 is, for example, 100-300 mm.

The body 3 is rotatable around the rotation axis O1. There are no special limitations imposed on the shape of the body 3. The body 3 may have, for example, an approximately columnar shape or an approximately conical shape, and may include concave-convex portions, etc.

The body 3 may be configured with one member or a plurality of members. For example, the body 3 may include a base 13 and a first cartridge 15 as in the non-limiting embodiment illustrated in FIG. 1. The body 3 may include a member other than the base 13 and the first cartridge 15.

Figure 2:
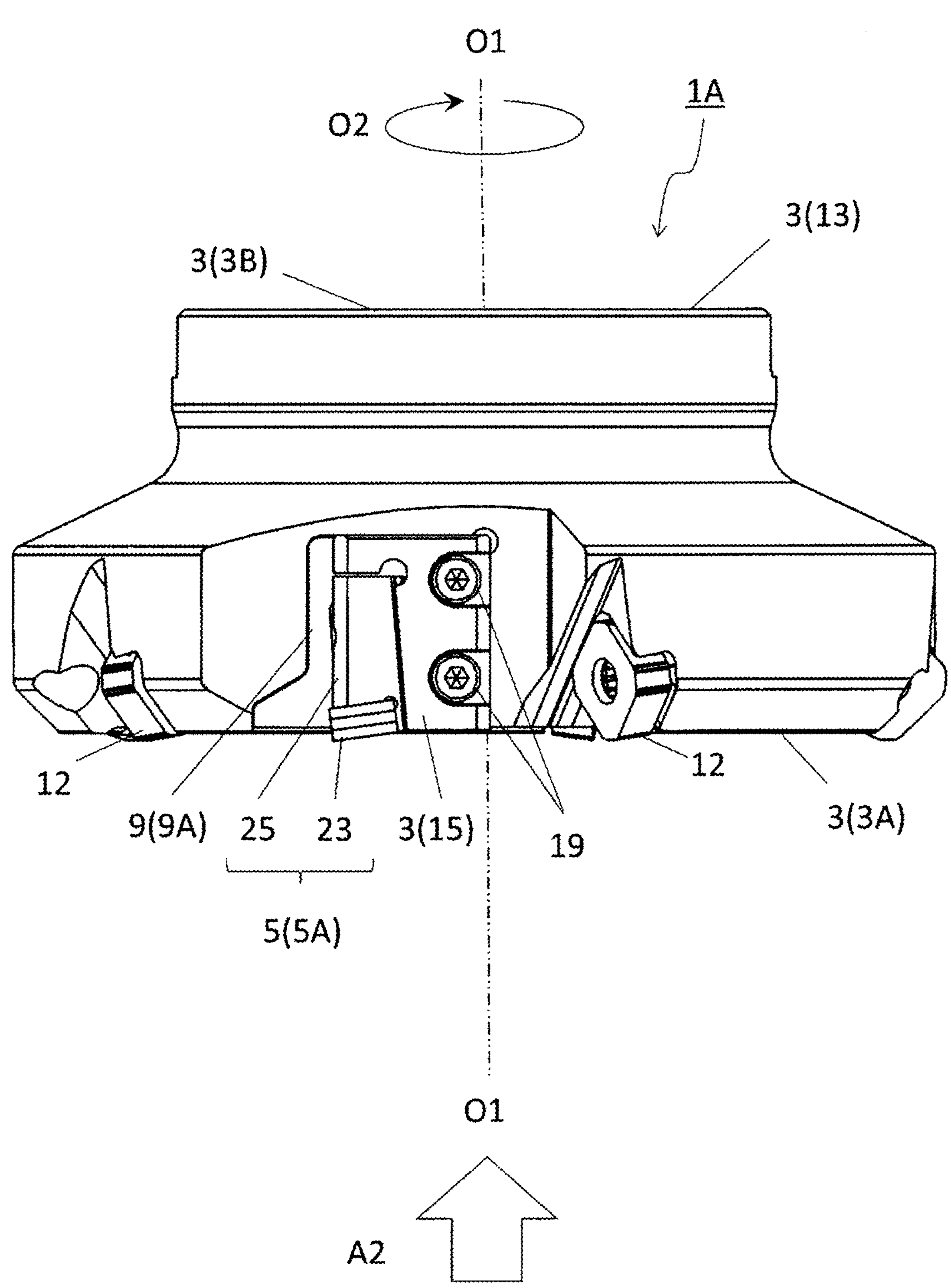
FIG. 2 is a plan view of the cutting tool illustrated in FIG. 1 as viewed from A1 direction.

The first cartridge 15 is a member to be attached to the base 13. The first cartridge 15 may be used for forming the first pocket 9A in the body 3. The first pocket 9A is adjacent to the first cartridge 15 on a front side in the rotation direction O2 of the rotation axis O1 in the non-limiting embodiment illustrated in FIG. 2. FIG. 2 is a drawing of the cutting tool 1A illustrated in FIG. 1 as viewed from A1 direction (as viewed from the side).

Figure 4:
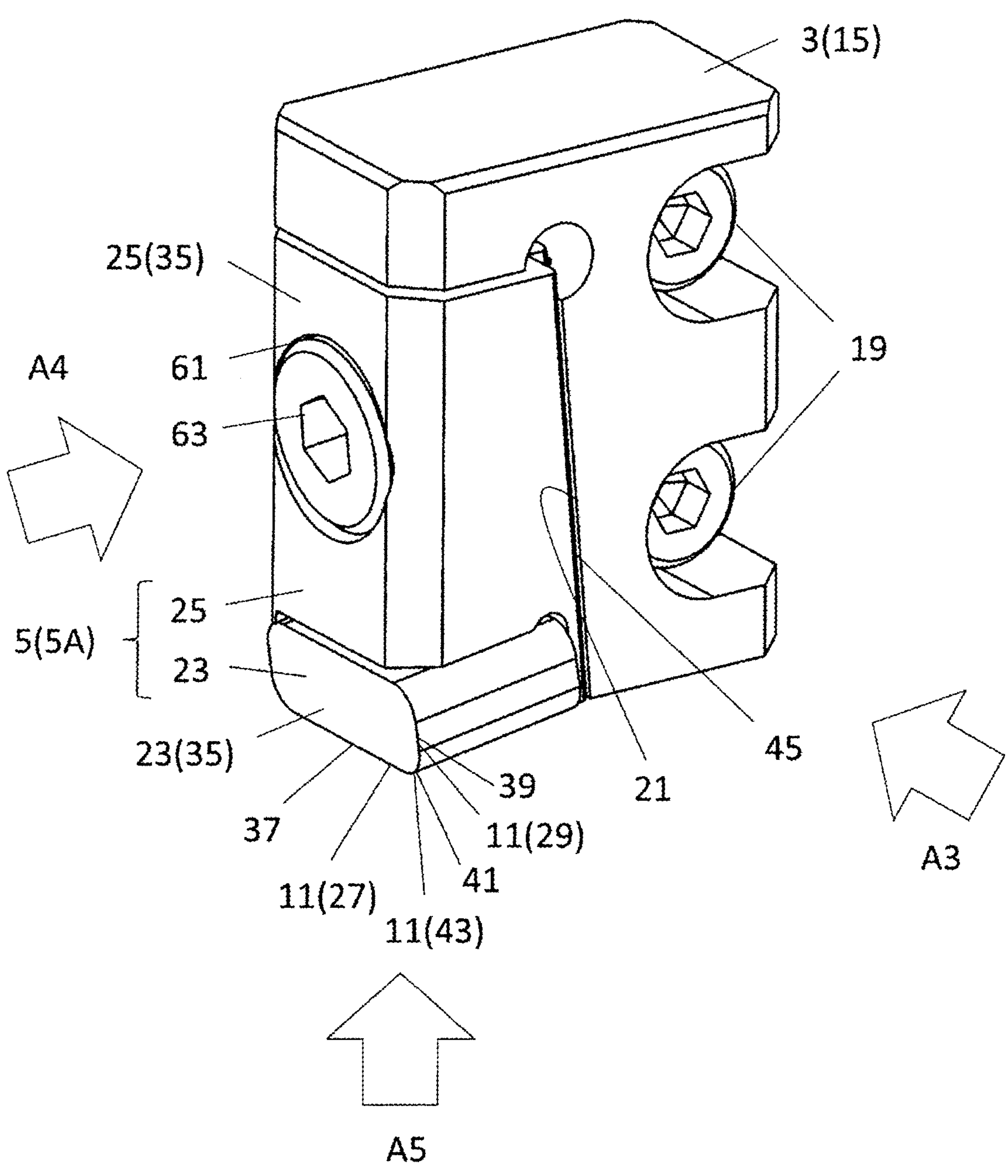
FIG. 4 is a perspective view illustrating a body (first cartridge), a first cutting part, a fixture, etc. in the cutting tool illustrated in FIG. 1.
Figure 5:
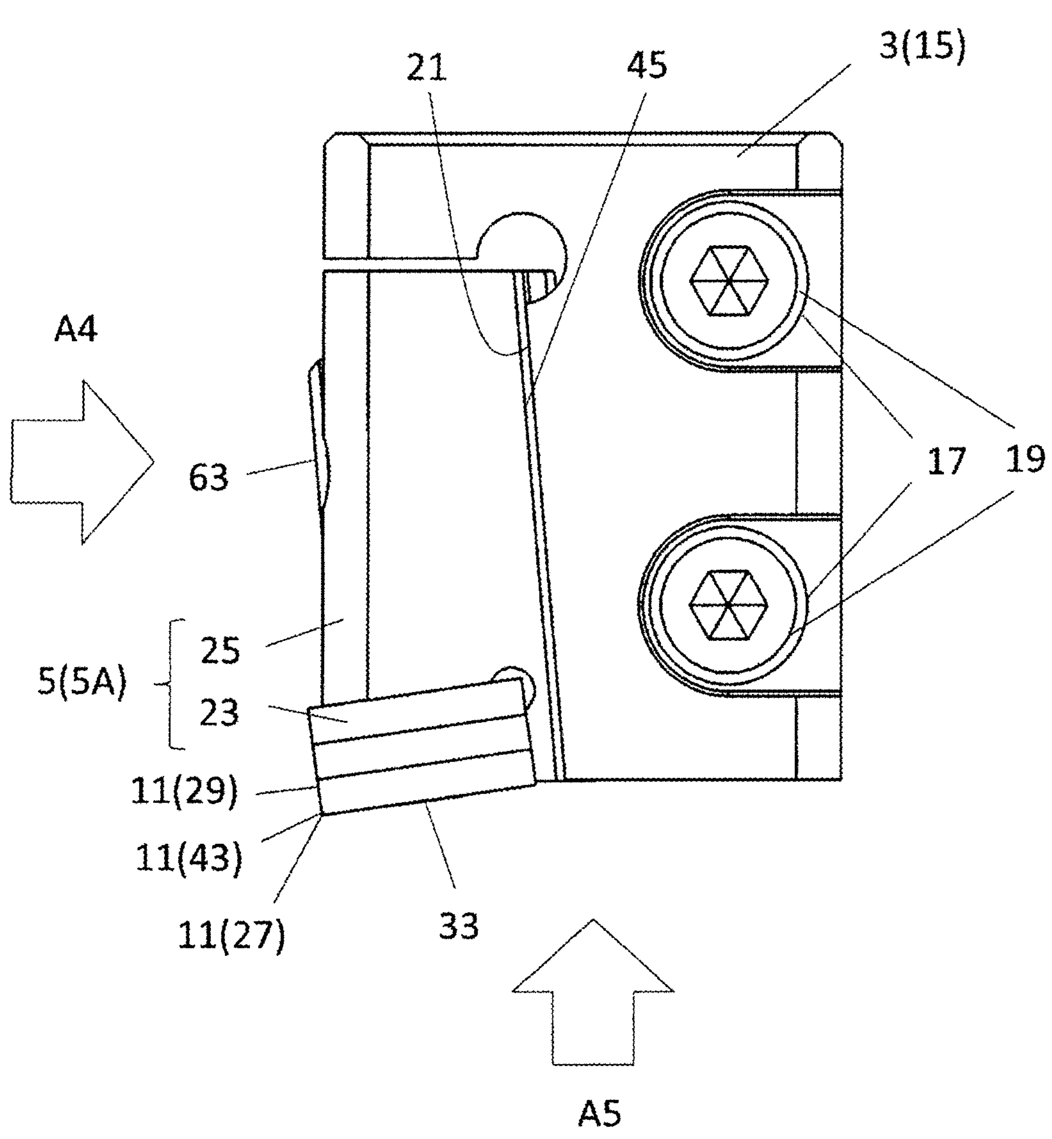
FIG. 5 is a plan view of a part illustrated in FIG. 4 as viewed from A3 direction.

The first cartridge 15 may include a first hole 17 that is open as in a non-limiting embodiment illustrated in FIG. 5. FIG. 5 is a drawing of the part illustrated in FIG. 4 as viewed from A3 direction (as viewed from the side). The first hole 17 may be used as an insertion hole for a first fixture 19 when attaching the first cartridge 15 to the base 13. Examples of the first fixture 19 may include a screw and a clamp.

The first pocket 9A includes a first seating surface 21 directed to the front in the rotation direction O2 of the rotation axis O1. This may be rephrased as follows: The body 3 includes the first seating surface 21. The first cartridge 15 includes the first seating surface 21 in a non-limiting embodiment illustrated in FIG. 4.

The first cutting part 5A located in the first pocket 9A includes a cutting edge 11 located on a side of the first end 3A. A machined product is manufacturable by machining a workpiece with the cutting edge 11. The first cutting part 5A may be configured with one or a plurality of members. The first cutting part 5A in the non-limiting embodiment illustrated in FIG. 4 includes a first insert 23 and a second cartridge 25.

Figure 6:
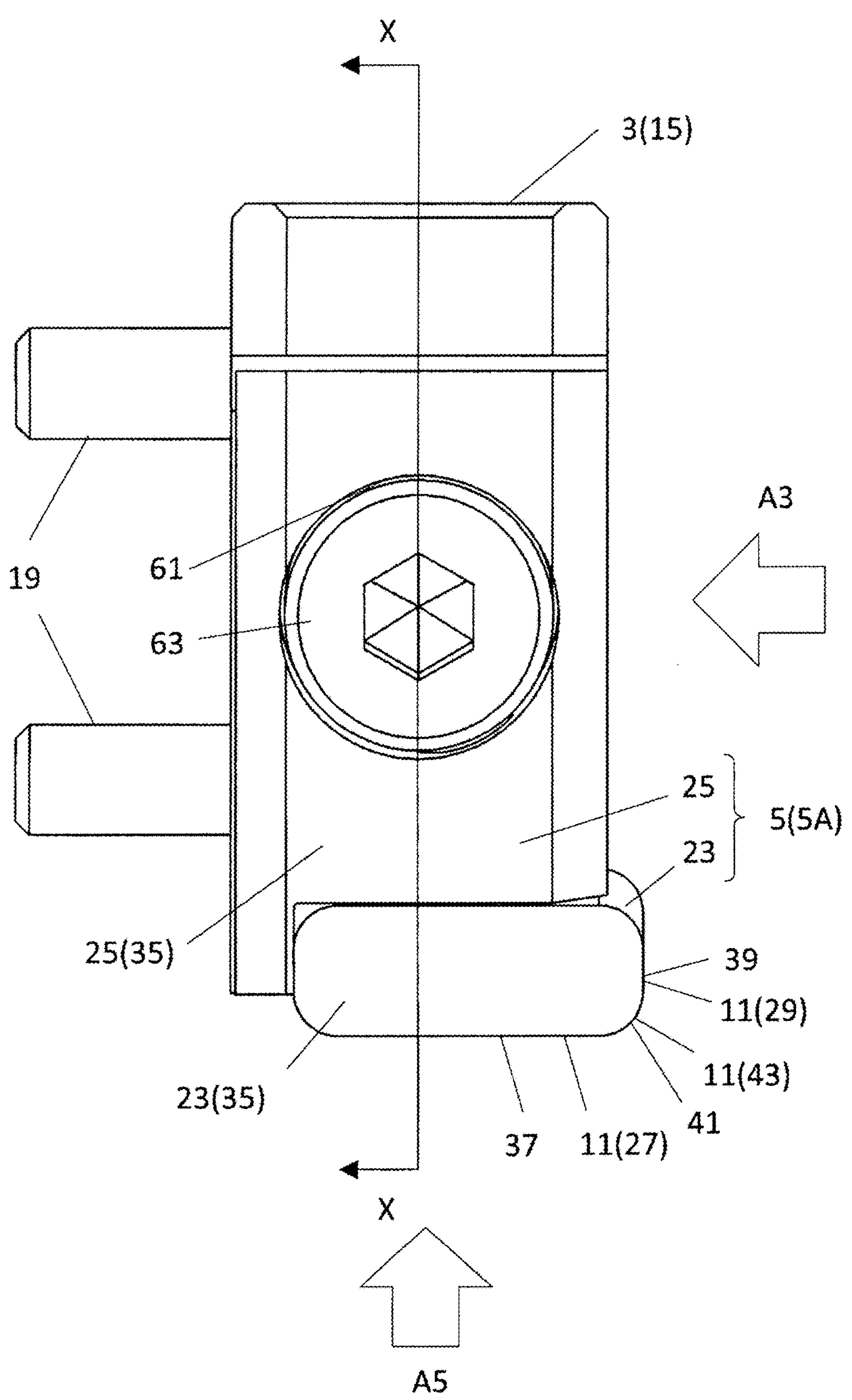
FIG. 6 is a plan view of the part illustrated in FIG. 4 as viewed from A4 direction.

The first insert 23 includes the cutting edge 11 in the non-limiting embodiment illustrated in FIG. 4. The cutting edge 11 is located on a front side in the rotation direction O2 and a side of the first end 3A in the first insert 23. The cutting edge 11 need not be located only at this part. For example, if the cutting edge 11 located on the front side in the rotation direction O2 and on the side of the first end 3A in the first insert 23 is a first cutting edge 27, the first insert 23 may further include a second cutting edge 29 located on the front side in the rotation direction O2 and on a side of an outer periphery in the first insert 23. The first cutting edge 27 and the second cutting edge 29 are not limited to having a straight line shape as illustrated in FIG. 6, but may have a curvilinear shape. FIG. 6 is a drawing of the part illustrated in FIG. 4 as viewed from A4 direction (as viewed from the front).

Figure 7:
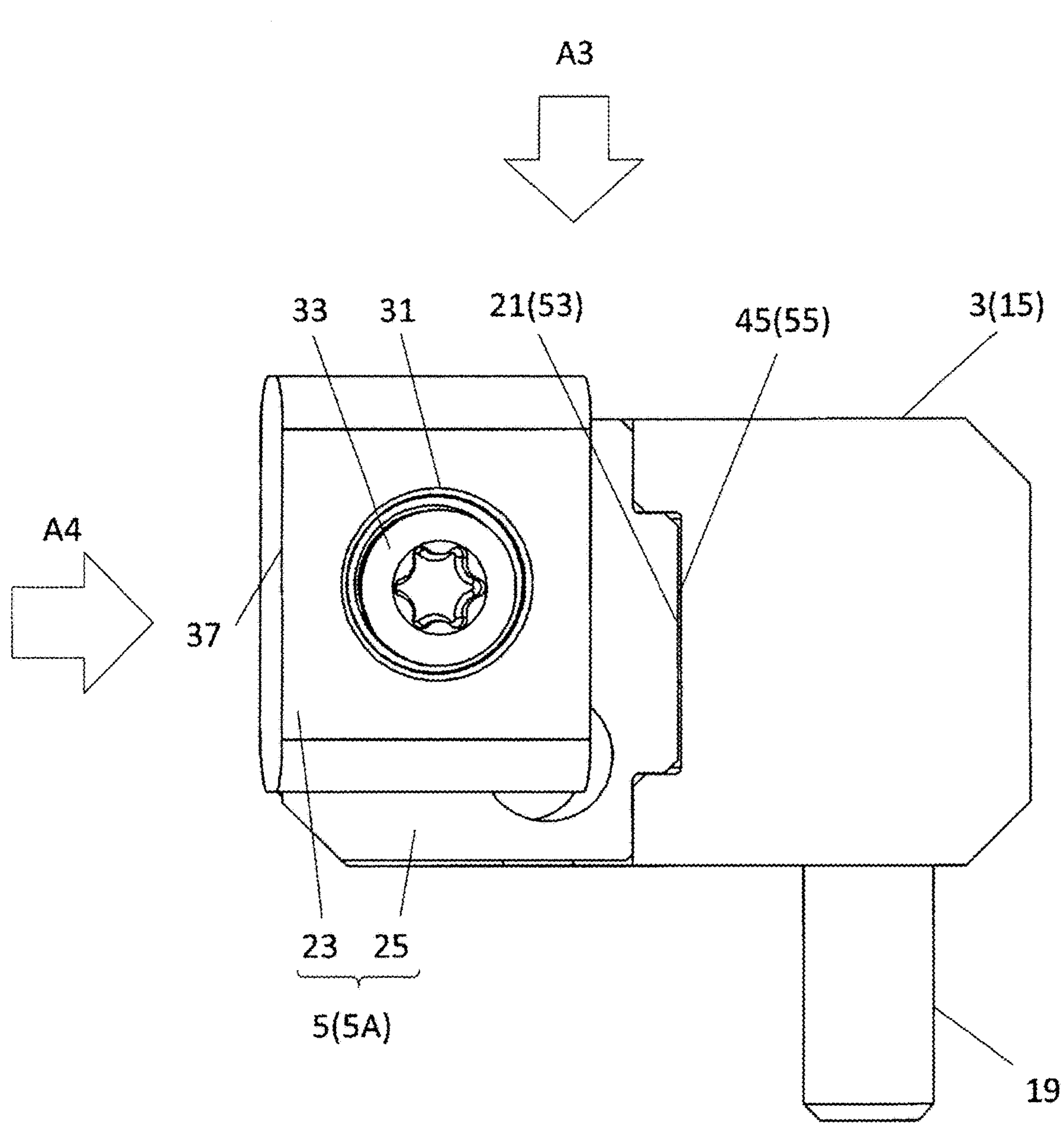
FIG. 7 is a plan view of the part illustrated in FIG. 4 as viewed from A5 direction.

The first insert 23 is located on the front side in the rotation direction O2 with respect to the second cartridge 25. The first insert 23 may have a second hole 31 and may be fixed to the second cartridge 25 with a second fixture 33, such as a screw, as in a non-limiting embodiment illustrated in FIG. 7. FIG. 7 is a drawing of the part in FIG. 4 as viewed from A5 direction (as viewed from a side of the first end 3A).

A length of the first cutting part 5A in a direction along the rotation axis O1 is, for example, 30-50 mm. A length of the first cutting part 5A in a direction orthogonal to the rotation axis O1 is, for example, 15-35 mm.

The first cutting part 5A may include a front surface 35. The front surface 35 is a surface located on the front side in the rotation direction O2 in the first cutting part 5A. There are no special limitations imposed on the shape of the front surface 35, but may have, for example, a planar shape or a curved shape, and may include concave-convex portions. The front surface 35 may include a first side 37, a second side 39, and a first corner 41. The first side 37 may be located on a side of the first end 3A. The second side 39 may be located on a side of the outer periphery away from the rotation axis O1. The first corner 41 may be a corner connecting to the first side 37 and the second side 39.

The first cutting edge 27 may be located on the first side 37. Because the first side 37 is located on the first end 3A as described above, the first cutting edge 27 located on the first side 37 can be located on the side of the first end 3A in the cutting part 5. The second cutting edge 29 may be located on the second side 39. Because the second side 39 is located on the side away from the rotation axis O1 as described above, the second cutting edge 29 located on the second side 39 can be located on the side away from the rotation axis O1 in the cutting part 5.

The first cutting part 5A may include a third cutting edge 43 located on the first corner 41. The third cutting edge 43 may be sequentially disposed side by side with respect to the first cutting edge 27 or the second cutting edge 29. The third cutting edge 43 is not limited to having a curvilinear shape as illustrated in FIG. 6, but may include a straight line shape or may have a circular arc shape.

The first cutting part 5A may include a rear surface 45. The rear surface 45 is a surface located on a rear side in the rotation direction O2 in the first cutting part 5A. There are no special limitations imposed on the shape of the rear surface 45, but may have, for example, a planar shape or a curved shape, and may include concave-convex portions. The rear surface 45 of the first cutting part 5A is opposed to the first seating surface 21 of the first pocket 9A.

The first seating surface 21 may be in contact with the rear surface 45 as in the non-limiting embodiment illustrated in FIG. 5. In this case, a sliding direction of the rear surface 45 tends to become stable. As to the term “be in contact with” used herein, all of the first seating surface 21 and the rear surface 45 need not be in contact with each other without any gap therebetween. Specifically, a gap of 0.05-0.01 mm may be present partially between the first seating surface 21 and the rear surface 45.

Figure 10:
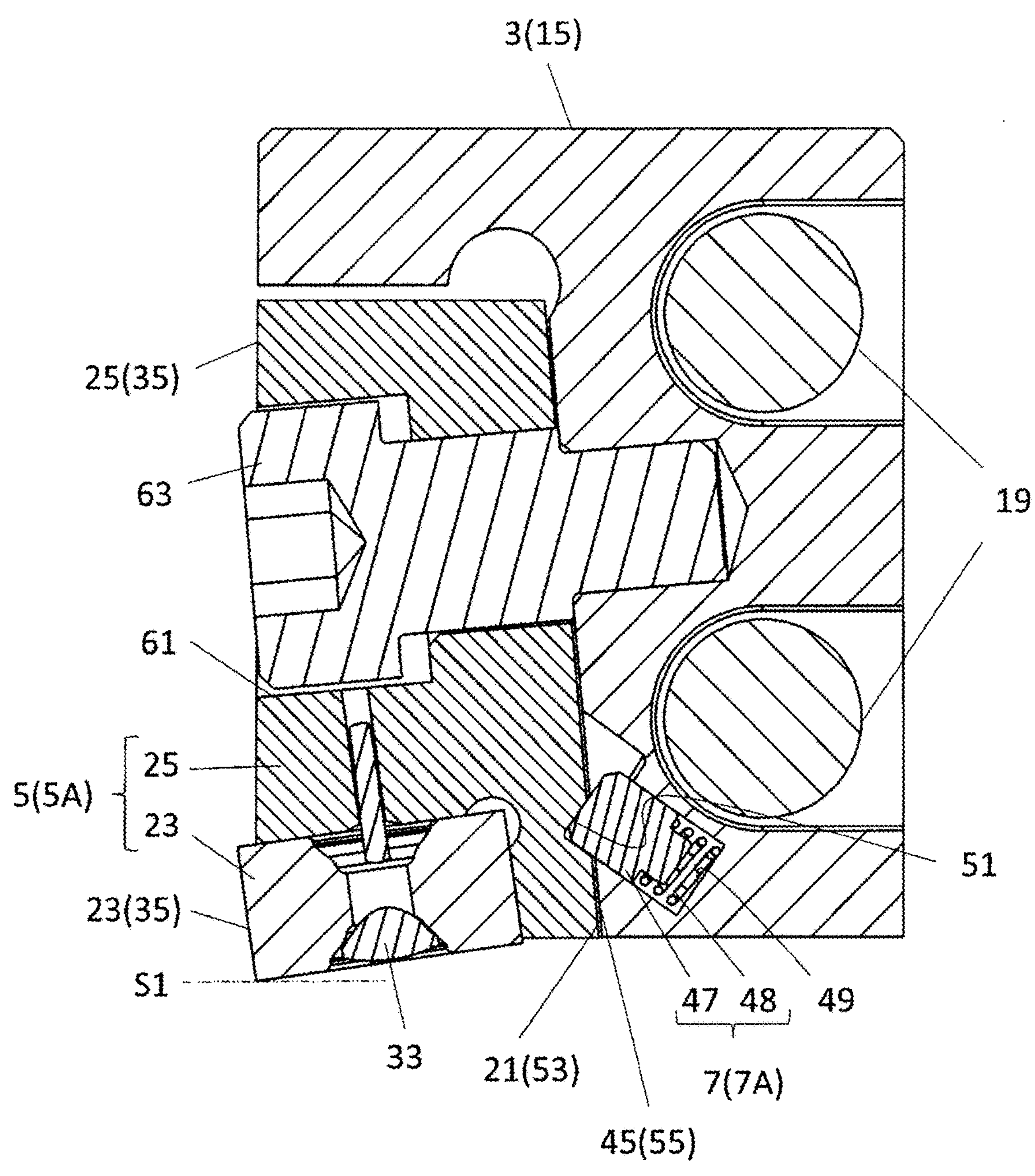
FIG. 10 is a sectional view of a cross section taken along line X-X illustrated in FIG. 6, specifically a state of the part illustrated in FIG. 4 during machining.

The first elastic body 7A is located between the body 3 and the first cutting part 5A as in a non-limiting embodiment illustrated in FIG. 10. FIG. 10 is a drawing illustrating a state where the part illustrated in FIG. 4 during machining is cut along the line X-X illustrated in FIG. 6. A cross section along line X-X is the cross section that passes through a center of the second cartridge 25 and is parallel to the rotation axis O1. The cross section along line X-X may include a central axis N1 of the first elastic body 7A (refer to FIG. 11). Specifically, the first elastic body 7A is located between the first seating surface 21 in the first pocket 9A and the rear surface 45 in the first cutting part 5A. In this case, the first elastic body 7A may be in contact with the first seating surface 21 and the rear surface 45. The first elastic body 7A is capable of applying an urging force in a direction toward the second end 3B to the first cutting part 5A. The rear surface 45 is slidable toward the second end 3B. In other words, the first cutting part 5A is slidable because the rear surface 45 is a part of the first cutting part 5A.

Figure 30:
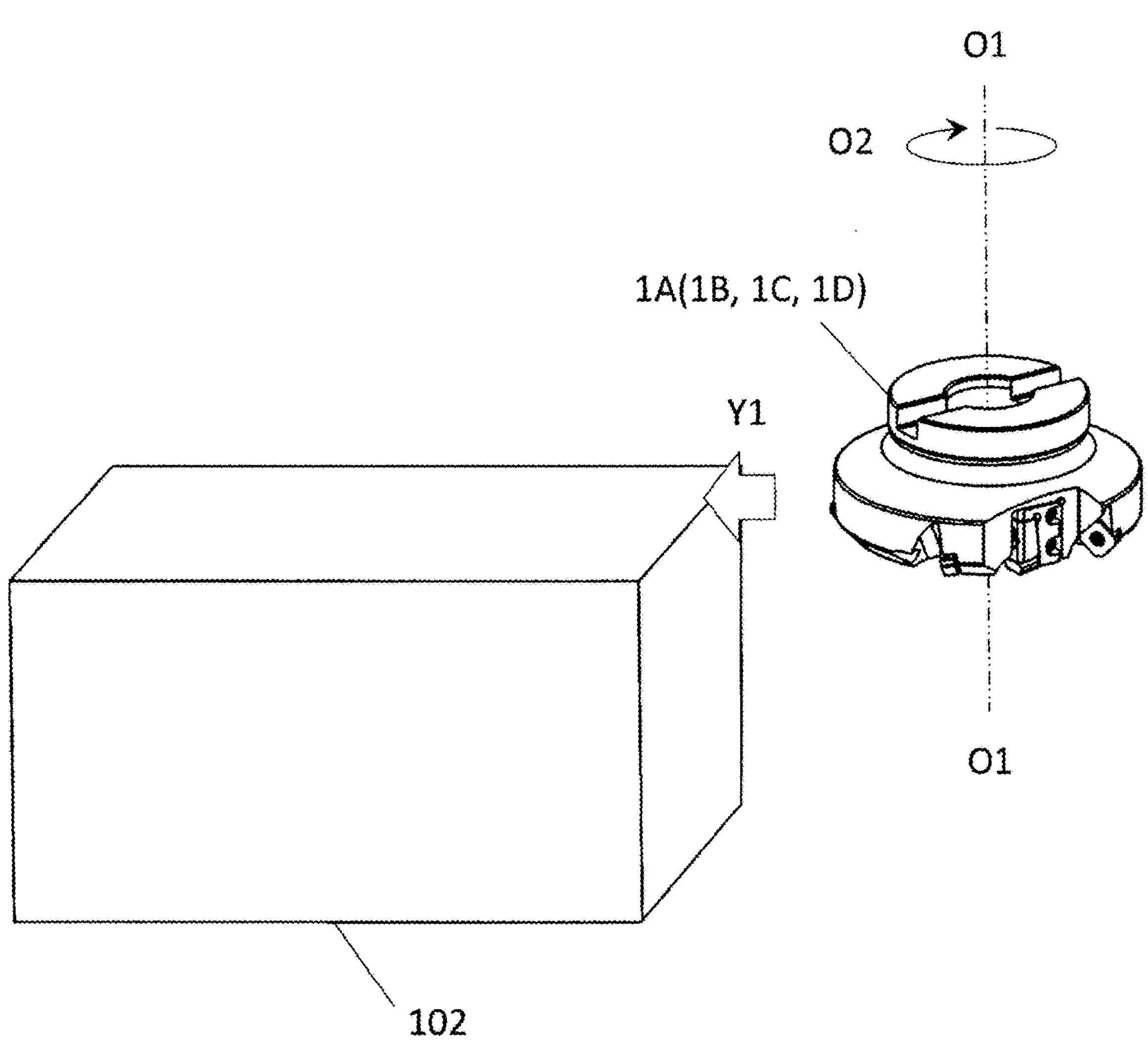
FIG. 30 is a schematic explanatory diagram illustrating one of steps in a method for manufacturing a machined product in one embodiment.

In a non-limiting embodiment illustrated in FIG. 30, the cutting tool 1A goes ahead toward a predetermined direction (so-called feed direction) while rotating around the rotation axis O1 during a machining process of a workpiece. The first cutting part 5A is capable of contributing to the machining process when being located on a front side in the feed direction Y1 with respect to the rotation axis O1. Preferably, the first cutting part 5A does not contribute to the machining process when being located on a rear side in the feed direction Y1 with respect to the rotation axis O1. This is because a machined surface might be damaged to form the so-called crossed line pattern on the machined surface due to the fact that the first cutting part 5A comes into contact with the workpiece when being located on the rear side in the feed direction Y1 with respect to the rotation axis O1.

If the first cutting part 5A comes into contact with the workpiece during the machining process of the workpiece, a cutting load tends to be applied from the workpiece to the cutting part 5 in a direction toward the workpiece, in other words, in a direction away from the second end 3B. Therefore, the first cutting part 5A tends to be drawn in the workpiece, and the machining process proceeds easily. A position of the first cutting edge 27 at this time, that is, during machining is a first cutting edge position S1 (refer to FIG. 10).

Figure 11:
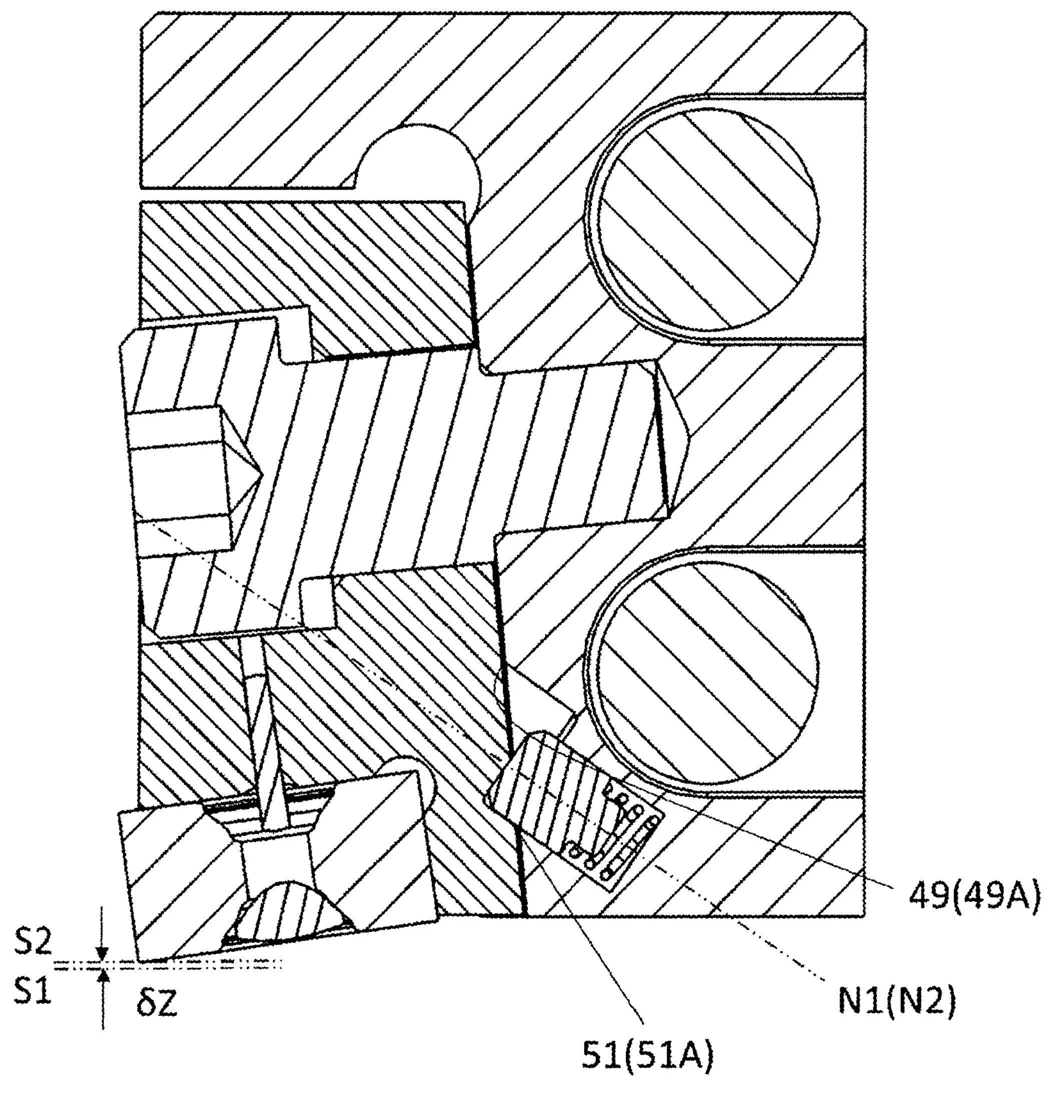
FIG. 11 is a sectional view of a state of the part illustrated in FIG. 10 during non-machining.

The cutting tool 1A in the first embodiment includes the first elastic body 7A. Therefore, if the first cutting part 5A is located on the rear side in the feed direction Y1 with respect to the rotation axis O1, the first elastic body 7A is capable of applying an urging force in a direction toward the second end 3B to the first cutting part 5A. At this point, the rear surface 45 of the first cutting part 5A is slidable toward the second end 3B. Hence, the first cutting part 5A is slidable toward the second end 3B when the first cutting part 5A is located on the rear side in the feed direction Y1 with respect to the rotation axis O1 than when the first cutting part 5A is located on the front side in the feed direction Y1 with respect to the rotation axis O1. A position of the first cutting edge 27 at this time, that is, during non-machining is a second cutting edge position S2 (refer to FIG. 11). FIG. 11 is a drawing that corresponds to FIG. 10 and illustrates a state of the part illustrated in FIG. 4 during non-machining. A distance (82) between the first cutting edge position S1 and the second cutting edge position S2 in the direction along the rotation axis O1 is, for example, 0.05-0.2 mm.

When the first cutting part 5A is located on the rear side in the feed direction Y1 with respect to the rotation axis O1, the first cutting part 5A slides toward the second end 3B, thus making it difficult for the first cutting part 5A to come into contact with the workpiece.

Specifically, when the first cutting part 5A is located on the front side in the feed direction Y1 with respect to the rotation axis O1, the first cutting part 5A comes into contact with the workpiece, and the workpiece can be subjected to the machining process by the first cutting part 5A. In contrast, when the first cutting part 5A is located on the rear side in the feed direction Y1 with respect to the rotation axis O1, the first cutting part 5A slides in a direction away from the workpiece, thus making it difficult for the first cutting part 5A to come into contact with the workpiece.

The risk of the crossed line pattern is reducible by the foregoing operations. Additionally, the above machining process can be carried out without tilting the rotation axis O1 of the cutting tool toward the front side in the feed direction. Therefore, a machining direction is not limited to one direction, thereby reducing a moving distance of the tool. Consequently, the above operations have high versatility and contribute to a reduction in machining time.

The first insert 23 in the cutting tool 1A may be a so-called wiper insert. Specifically, the cutting insert 12 performs an ordinary milling process of a workpiece, and the first insert 23 may be a finishing insert for improving surface accuracy of a machined surface of the workpiece. In this case, the first insert 23 may be protruded toward the first end 3A compared with the cutting insert 12.

The elastic body 7 is located in the pocket 9 (first pocket 9A) to which the first insert 23 that is the wiper insert is attached, whereas the elastic body 7 need not be located in the pocket 9 to which the cutting insert 12 that is the insert performing the ordinary milling process is attached. In this case, the cutting tool 1A is capable of reducing the risk of the crossed line pattern while including a minimum required number of elastic bodies 7. That is, it is possible to minimize a complicated structure for attaching the elastic body 7, and manufacturing cost for the cutting tool 1A can be reduced while reducing the risk of the crossed line pattern.

As described above, if the first elastic body 7A is in contact with the first seating surface 21 and the rear surface 45, the first elastic body 7A can easily move a relative position of the first cutting part 5A (including the rear surface 45) with respect to the body 3 (including the first seating surface 21) toward the second end 3B.

The first elastic body 7A is an elastically deformable member (elastic member) compared with the body 3 and the first cutting part 5A. The first elastic body 7A is not limited to one which is configured with a single elastic member, but a plurality of elastic members may be combined together. Alternatively, the first elastic body 7A may be a structure including a member other than the elastic member. The term "member other than the elastic member" as used herein included in the first elastic body 7A means one which is integrally used with the elastic member by being joined to the elastic member, and means a member that applies the urging force to an object together with the elastic member. The term "object" as used herein may be, for example, the first cutting part 5A. The member other than the elastic member may be, for example, a pin 47 as in a non-limiting embodiment illustrated in FIG. 10.

The elastic member is not limited to a specific material type. Examples of the elastic member may include various springs and members having a high Young's modulus. Specific examples of the spring may include leaf springs, disk springs and helical springs. The term "high Young's modulus" as used herein does not mean that it is necessary to have a specific value or more. However, it may be higher than, for example, the body 3 and the first cutting part 5A. Young's modulus can be evaluated by, for example, well-known nanoindentation method. The cutting tool 1A in the first embodiment employs a helical spring 48.

Examples of the member having a high Young's modulus may include resins and rubbers. Examples of the resins may include polycarbonate resin, polyethylene terephthalate resin, acrylic resin, polyvinyl chloride resin, silicone resin, and epoxy resin. Examples of the rubbers may include natural rubbers and synthetic rubbers.

The first elastic body 7A applies an urging force to the first cutting part 5A. The term "urging force" as used herein may be a force acting when the elastically deformed elastic body 7 returns to its original state, in other words, an elastic force. The urging force may be not only such a force that the first elastic body 7A directly applies to the first cutting part 5A, but also such a force that the first elastic body 7A indirectly applies through other member to the first cutting part 5A. Alternatively, the first cutting part 5A may include a fulcrum, and the first elastic body 7A may apply the urging force so that the first cutting part 5A can slide toward the second end 3B by rotating movement of the first cutting part 5A around the fulcrum. The first elastic body 7A may apply the urging force to the first cutting part 5A in a direction other than the direction toward the second end 3B. For example, the first elastic body 7A may apply the urging force toward the front side or the rear side in the rotation direction O2.

The rear surface 45, that is, the first cutting part 5A is slidable toward the second end 3B. The term "slidable toward the second end 3B" as used herein does not mean slidable only toward the second end 3B but means having an element (vector) that slides toward the second end 3B. Therefore, in the course of sliding of the first cutting part 5A, the first cutting part 5A may move in a direction toward the rotation axis O1 or away from the rotation axis O1, or may move to the front side or the rear side in the rotation direction O2.

The first seating surface 21 may be inclined toward the front side in the rotation direction O2 as coming closer to the second end 3B as in the non-limiting embodiment illustrated in FIG. 5. In other words, the first seating surface 21 may be inclined toward the rear side in the rotation direction O2 as coming closer to the first end 3A. In this case, a cutting load exerted on the first seating surface 21 tends to be dispersed in a direction along the rotation axis O1. This contributes to avoiding damage to the first cartridge 15, namely, the body 3 due to the cutting load. When the first cutting part 5A performs a machining process of a workpiece while being located on the front side in the feed direction Y1 with respect to the rotation axis O1, the first cutting part 5A slides in a direction toward the workpiece, and the workpiece tends to be appropriately machined. Therefore, when the first cutting part 5A is located on the rear side in the feed direction Y1 with respect to the rotation axis O1, the first cutting part 5A is still unlikely to come into contact with the workpiece.

Figure 8:
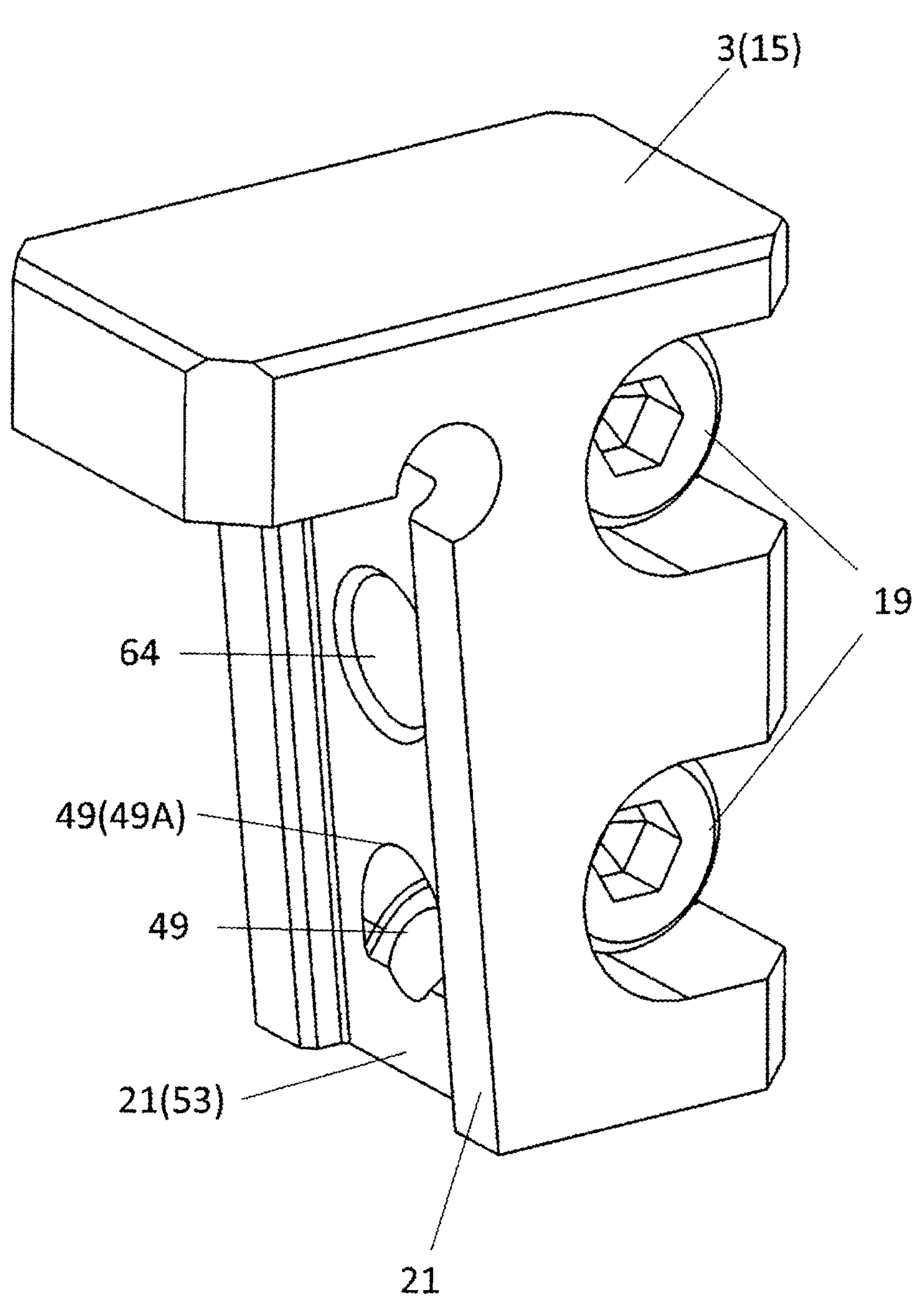
FIG. 8 is a perspective view illustrating the body in FIG. 4.

The first seating surface 21 is not limited to having a shape such as that in an embodiment illustrated in FIG. 8, but may have a planar shape or a curved shape, or may include concave convex portions. The term "inclined toward the front side in the rotation direction O2 as coming closer to the second end 3B" as used herein does not mean a strict continuous inclination, but there may be a part parallel to the rotation axis O1.

The first seating surface 21 may include a first concave part 49 as in a non-limiting embodiment illustrated in FIG. 8. The rear surface 45 may include a second concave part 51 as in a non-limiting embodiment illustrated in FIG. 9. The second concave part 51 may be opposed to the first concave part 49 as in a non-limiting embodiment illustrated in FIG. 10. The first elastic body 7A may be inserted into the first concave part 49 and the second concave part 51. The first elastic body 7A may be in contact with the first concave part 49 and the second concave part 51. If the first elastic body 7A is inserted into the first concave part 49 and the second concave part 51, it is easy to cause the first seating surface 21 and the rear surface 45 to come into contact with each other while causing the first elastic body 7A to be located between the body 3 and the first cutting part 5A. If the first elastic body 7A is in contact with the first concave part 49 and the second concave part 51, it is possible to efficiently transmit the urging force to the first cutting part 5A.

As to the phrase that "the second concave part 51 is opposed to the first concave part 49" as used herein, at least a part of an opening part 49A of the first concave part 49 and at least a part of an opening part 51A of the second concave part 51 may be continuous with each other (refer to FIG. 11). Hence, for example, a shape of the opening part 49A of the first concave part 49 and a shape of the opening part 51A of the second concave part 51 do not need to match, and all of the opening part 49A of the first concave part 49 and all of the opening part 51A of the second concave part 51 do not need to be opposed to each other.

The shape of the first concave part 49 is not particularly limited, and a width and a depth of the first concave part 49 are also not limited. The width of the first concave part 49 may be constant or changed.

Similarly to the shape of the first concave part 49, the shape of the second concave part 51 is not particularly limited. Similarly to the width and the depth of the first concave part 49, a width and a depth of the second concave part 51 are also not limited.

The first elastic body 7A may be fittingly crossed with the first concave part 49. For example, the pin 47 and the helical spring 48 are fittingly crossed with the first concave part 49 and are slidable in a direction along the central axis N1 of the first elastic body 7A in FIG. 10. As in a non-limiting embodiment illustrated in FIG. 11, the central axis N1 of the first elastic body 7A may coincide with a central axis N2 of the first concave part 49. With the configuration that the first elastic body 7A is fittingly crossed with the first concave part 49, a position of the first elastic body 7A tends to become stable. Accordingly, the first elastic body 7A can easily apply the urging force to the rear surface 45. The first elastic body 7A may be fittingly crossed with the second concave part 51. With the configuration that the first elastic body 7A is fittingly crossed with the second concave part 51, the position of the first elastic body 7A tends to become stable. Accordingly, the first elastic body 7A can easily apply the urging force to the rear surface 45.

The first seating surface 21 may include a first flute 53 as in the non-limiting embodiment illustrated in FIG. 8. The first flute 53 may extend from a side of the first end 3A toward a side of the second end 3B. A shape of the first flute 53 is not limited to that in the embodiment illustrated in FIG. 8, but may be a straight line shape or a curvilinear shape. A width and a depth of the first flute 53 need not be constant. The number of the first flute 53 is not limited to one but may be two or more.

Figure 9:
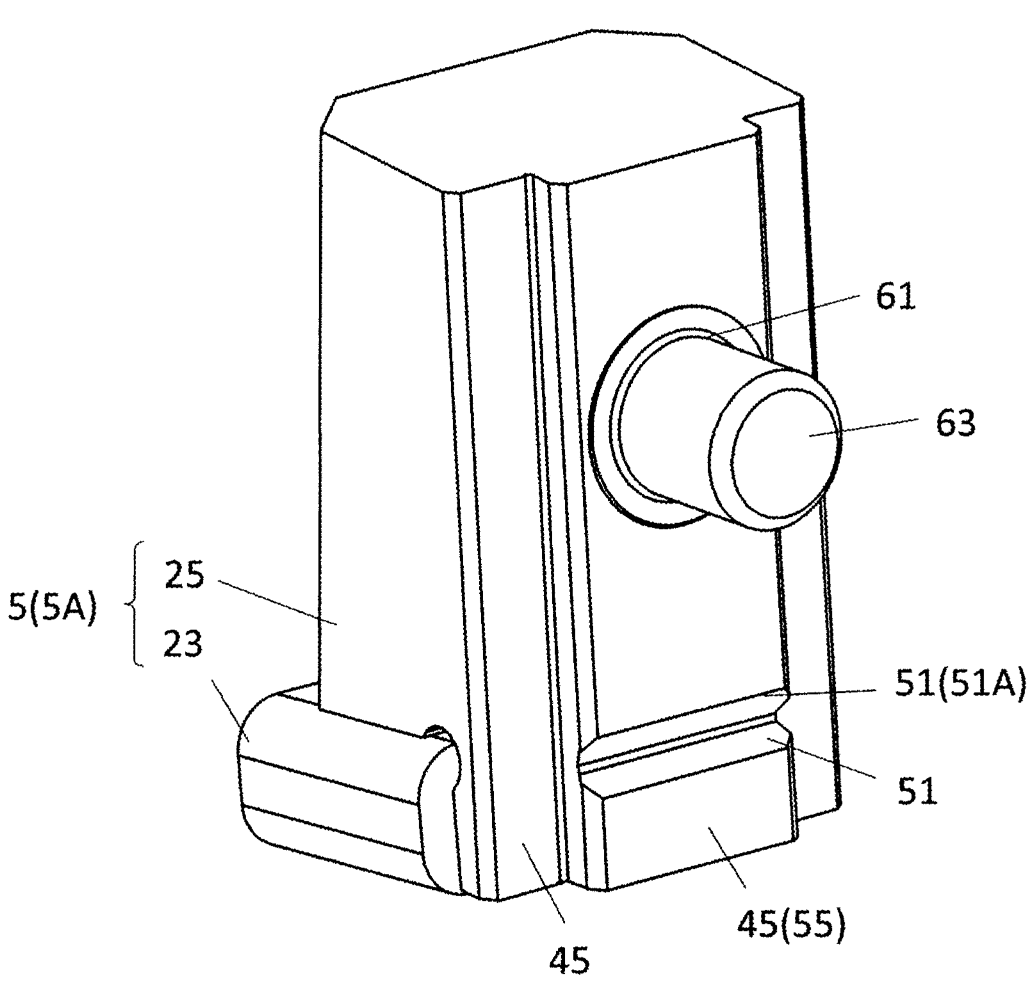
FIG. 9 is a perspective view illustrating the first cutting part in FIG. 4.

The rear surface 45 may include a first convex part 55 as in a non-limiting embodiment illustrated in FIG. 9. The first convex part 55 may be inserted into the first flute 53. With the configuration that the first convex part 55 is inserted into the first flute 53, a sliding direction of the rear surface 45 tends to become stable. A shape of the first convex part is not limited to that in the embodiment illustrated in FIG. 9, but may be a straight line shape or a curvilinear shape. A width and a height of the first convex part 55 need not be constant. FIG. 9 is a perspective view of the first cutting part 5A as viewed from a side of the rear surface 45.

The number of the first convex part 55 is not limited to one but may be two or more. With the configuration that the rear surface 45 includes a plurality of first convex parts 55 corresponding to the first flute 53 of the first seating surface 21, the sliding direction of the rear surface 45 becomes more stable. The first convex part 55 may have a line shape corresponding to the first flute 53 as in the non-limiting embodiment illustrated in FIG. 9. With the first convex part 55 having the line shape, the sliding direction of the rear surface 45 becomes more stable.

The first flute 53 may include the first concave part 49 as in the non-limiting embodiment illustrated in FIG. 8. The first convex part 55 may include the second concave part 51 as in the non-limiting embodiment illustrated in FIG. 9. In other words, the cutting tool 1A may include the first elastic body 7A between the first flute 53 and the first convex part 55. With this configuration of the cutting tool 1A, the first flute 53 and the first concave part 55 can have a large width in the rotation direction of the rotation axis O1, and the sliding direction of the rear surface 45 becomes more stable.

Figure 12:
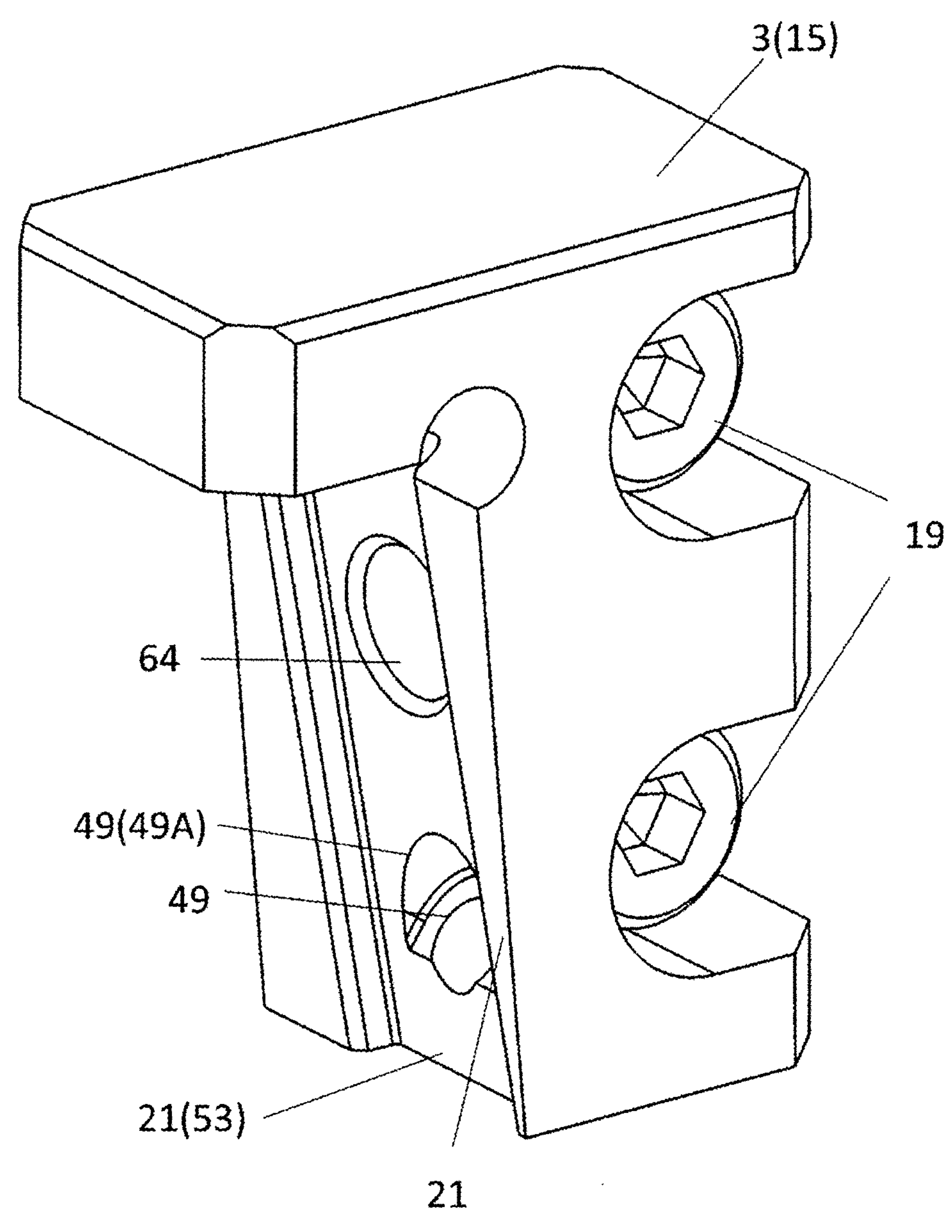
FIG. 12 is a perspective view of a first modification of the body illustrated in FIG. 8.

The first flute 53 may come closer to the rotation axis O1 as coming closer to the second end 3B as in a non-limiting embodiment illustrated in FIG. 12. In other words, the first flute 53 may go away from the rotation axis O1 as coming closer to the first end 3A. In this case, during machining, the cutting edge 11 moves toward the first end 3A and moves in a direction away from the rotation axis O1. Therefore, for example, in the case of including the second cutting edge 29, it is possible to enhance a feed rate in a milling process. As to the term "coming closer to the rotation axis O1 as coming closer to the second end 3B" as used herein, there is no need to strictly continue to come closer, and a part parallel to the rotation axis O1 may be included.

Figure 13:
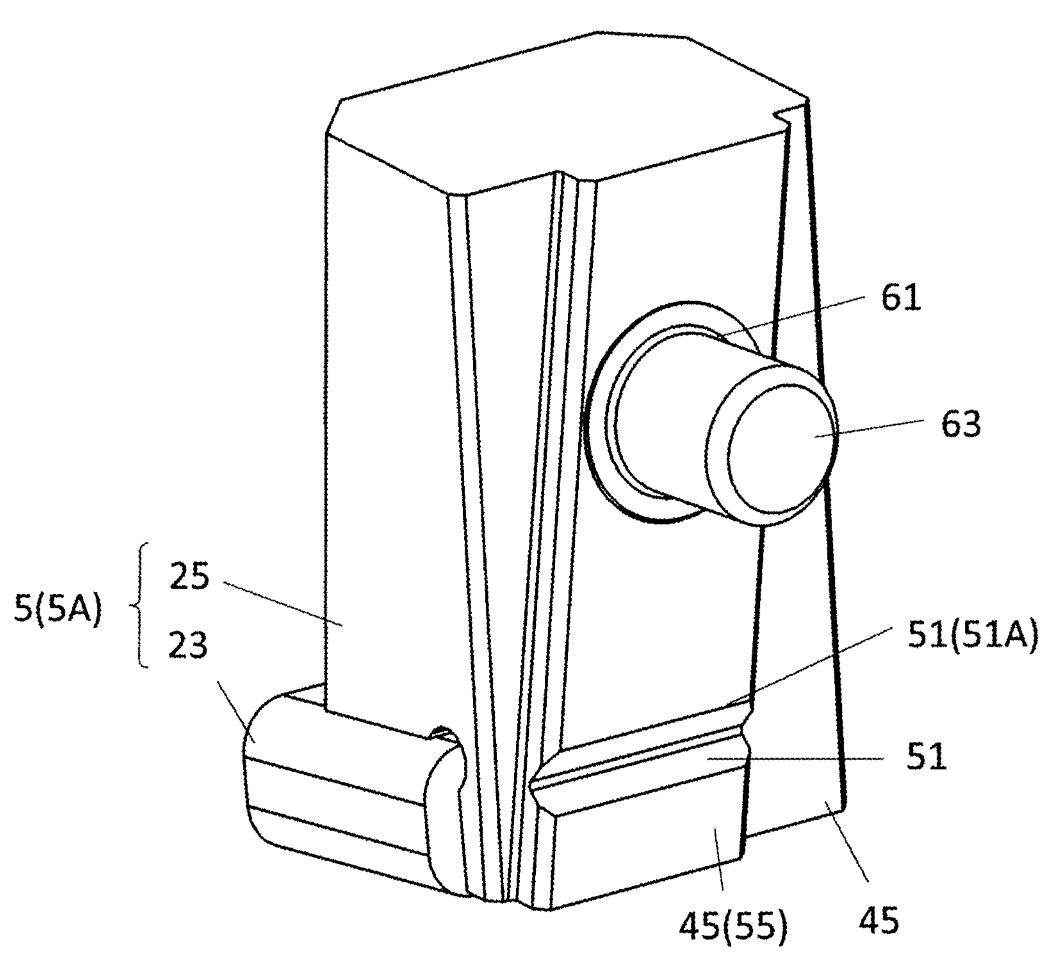
FIG. 13 is a perspective view of a first modification of the first cutting part illustrated in FIG. 9.

The first convex part 55 may come closer to the rotation axis O1 as coming closer to the second end 3B as in a non-limiting embodiment illustrated in FIG. 13. In other words, the first convex part 55 may go away from the rotation axis O1 as coming closer to the first end 3A. As to the term "coming closer to the rotation axis O1 as coming closer to the second end 3B" as used herein, there is no need to strictly continue to come closer, and a part parallel to the rotation axis O1 may be included.

The first concave part 49 and the second concave part 51 may be located closer to the rotation axis O1 than the first flute 53. This may be rephrased as "the first elastic body 7A may be closer to the rotation axis O1 than the first flute 53." That is, a distance between the rotation axis O1 and the first elastic body 7A may be smaller than a distance between the rotation axis O1 and the first flute 53. A part away from the rotation axis O1 in the first seating surface 21 is subjected to a larger cutting load received from a machining surface during machining than a part close to the rotation axis O1 in the first seating surface 21. In the above case, resistance force that the first elastic body 7A receives from the machining surface during the machining becomes lower, thereby avoiding the occurrence of breakage of the first elastic body 7A.

Figure 15:
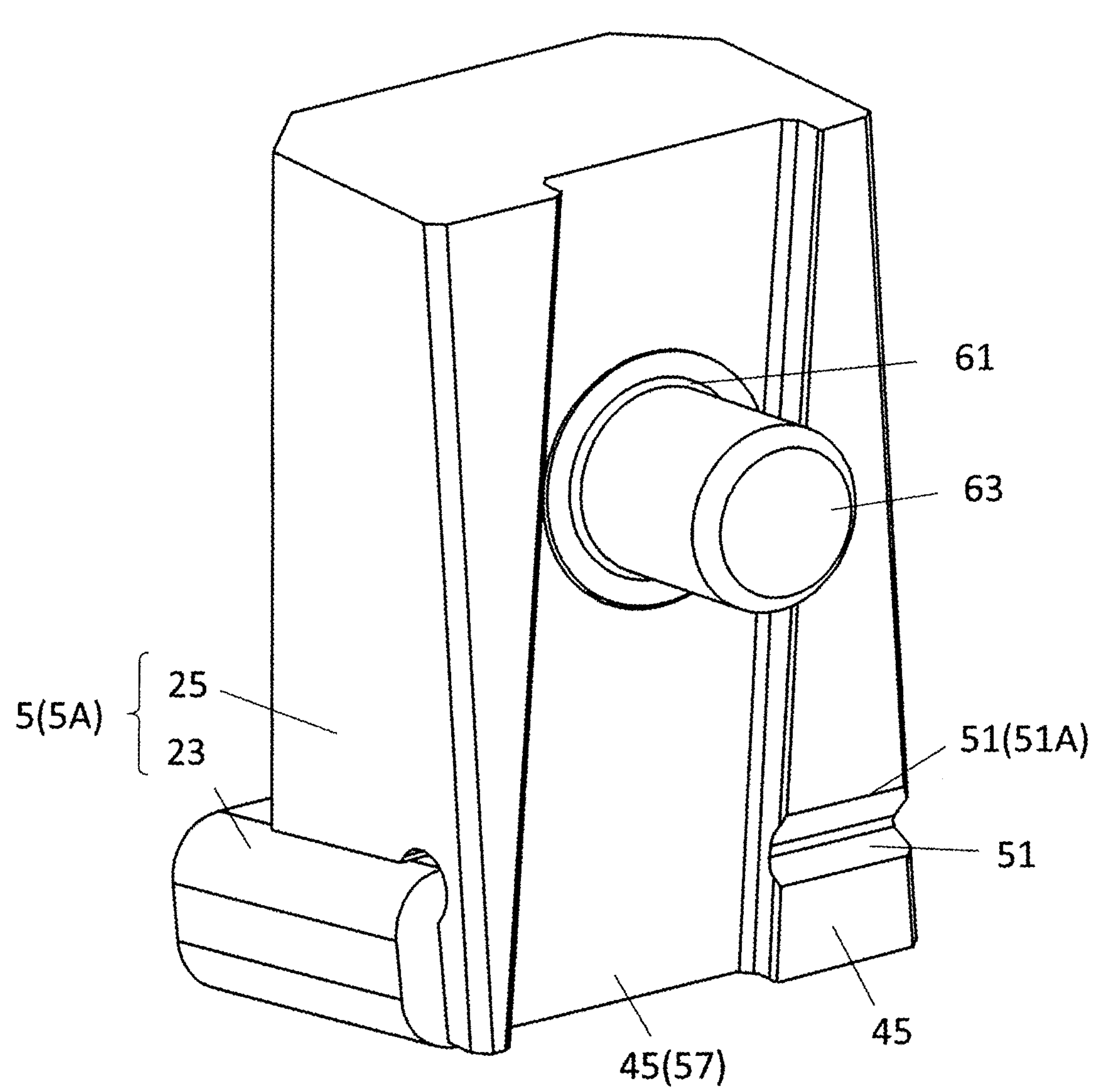
FIG. 15 is a perspective view of a second modification of the first cutting part illustrated in FIG. 9.

The rear surface 45 may include a second flute 57 as in a non-limiting embodiment illustrated in FIG. 15. The second flute 57 may extend from a side of the first end 3A toward a side of the second end 3B. A shape of the second flute 57 is not particularly limited but may be, for example, a straight line shape or a curvilinear shape. A width and a depth of the second flute 57 need not be constant. The number of the second flute 57 is not limited to one but may be two or more.

Figure 14:
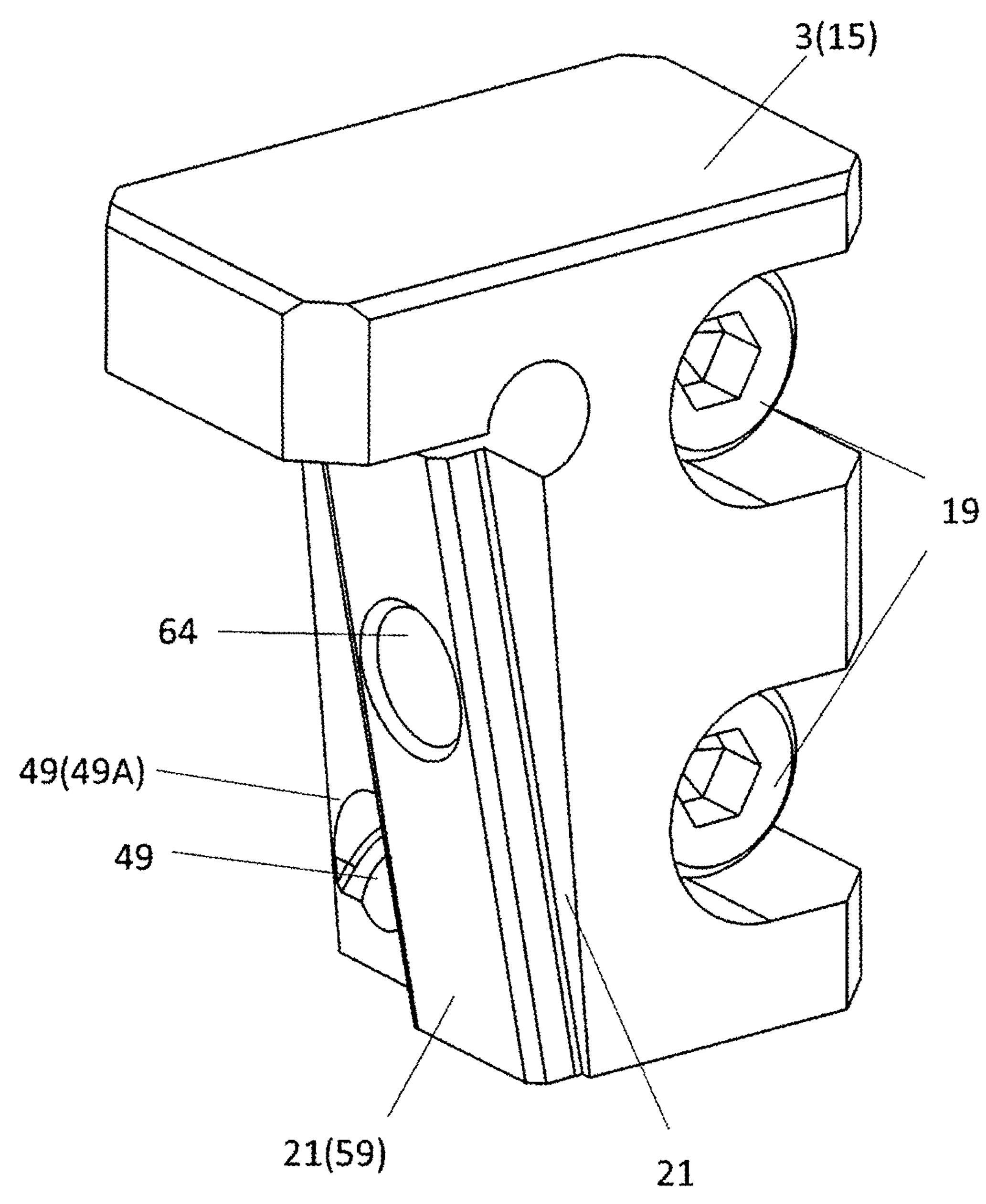
FIG. 14 is a perspective view of a second modification of the body illustrated in FIG. 8.

The first seating surface 21 may include a second convex part 59 as in a non-limiting embodiment illustrated in FIG. 14. The second convex part 59 may be inserted into the second flute 57. With the configuration that the second convex part 59 is inserted into the second flute 57, a sliding direction of the rear surface 45 tends to become stable. A shape of the second convex part 59 is not particularly limited. The shape of the second convex part 59 is not limited to that in the embodiment illustrated in FIG. 14, but may be a straight line shape or a curvilinear shape. A width and a height of the second convex part 59 need not be constant.

The number of the second convex part 59 is not limited to one but may be two or more. With the configuration that the first seating surface 21 includes a plurality of second convex parts 59 corresponding to the second flute 57 of the rear surface 45, the sliding direction of the rear surface 45 becomes more stable. The second convex part 59 may have a line shape corresponding to the second flute 57 as in the non-limiting embodiment illustrated in FIG. 14. With the second convex part 59 having the line shape, the sliding direction of the rear surface 45 becomes more stable.

The second flute 57 may come closer to the rotation axis O1 as coming closer to the second end 3B as in the non-limiting embodiment illustrated in FIG. 15. In other words, the second flute 57 may go away from the rotation axis O1 as coming closer to the first end 3A. In this case, during machining, the cutting edge 11 moves toward the first end 3A and moves in a direction away from the rotation axis O1. Therefore, for example, in the case of including the second cutting edge 29, it is possible to enhance the feed rate in the milling process. As to the term "coming closer to the rotation axis O1 as coming closer to the second end 3B" as used herein, there is no need to strictly continue to come closer, and a part parallel to the rotation axis O1 may be included.

The second convex part 59 may come closer to the rotation axis O1 as coming closer to the second end 3B as in the non-limiting embodiment illustrated in FIG. 14. In other words, the second convex part 59 may go away from the rotation axis O1 as coming closer to the first end 3A. As to the term "coming closer to the rotation axis O1 as coming closer to the second end 3B" as used herein, there is no need to strictly continue to come closer, and a part parallel to the rotation axis O1 may be included.

The first concave part 49 and the second concave part 51 may be located closer to the rotation axis O1 than the second flute 57 as in the non-limiting embodiment illustrated in FIGS. 14 and 15. This may be rephrased as "the first elastic body 7A may be located closer to the rotation axis O1 than the second flute 57." That is, the distance between the rotation axis O1 and the first elastic body 7A may be smaller than a distance between the rotation axis O1 and the second flute 57. A part away from the rotation axis O1 in the first seating surface 21 is subjected to a larger cutting load received from the machining surface during machining than a part close to the rotation axis O1 in the first seating surface 21. In the above case, resistance force that the first elastic body 7A receives from the machining surface during the machining becomes lower, thereby avoiding the occurrence of breakage of the first elastic body 7A.

The first cutting part 5A may include a first through hole 61. The first through hole 61 may open into the front surface 35 and the rear surface 45. The first cutting part 5A may also include a third fixture 63 to be fixed to the body 3 as in the non-limiting embodiment illustrated in FIG. 6. The third fixture 63 may be inserted into the first through hole 61. Examples of the third fixture 63 may include a screw. The third fixture 63 is only required to maintain a state where the first cutting part 5A is located in the pocket 9. Because the first cutting part 5A is slidable, there is no need to completely fix the first cutting part 5A to the body 3 by the third fixture 63. With this configuration of the first cutting part 5A, it is possible to stably hold the first cutting part 5A while being held in a slidable state. The first cutting part 5A may include a non-penetrating concave part instead of the first through hole 61, and the first cutting part 5A may be fixed to the body 3 by being fitted in the concave part.

The body 3 may include a third concave part 64. For example, the first cartridge 15 includes the third concave part 64 in the non-limiting embodiment illustrated in FIG. 8. The third fixture 63 may be inserted through the first through hole 61 of the first cutting part 5A into the third concave part 64.

Figure 16:
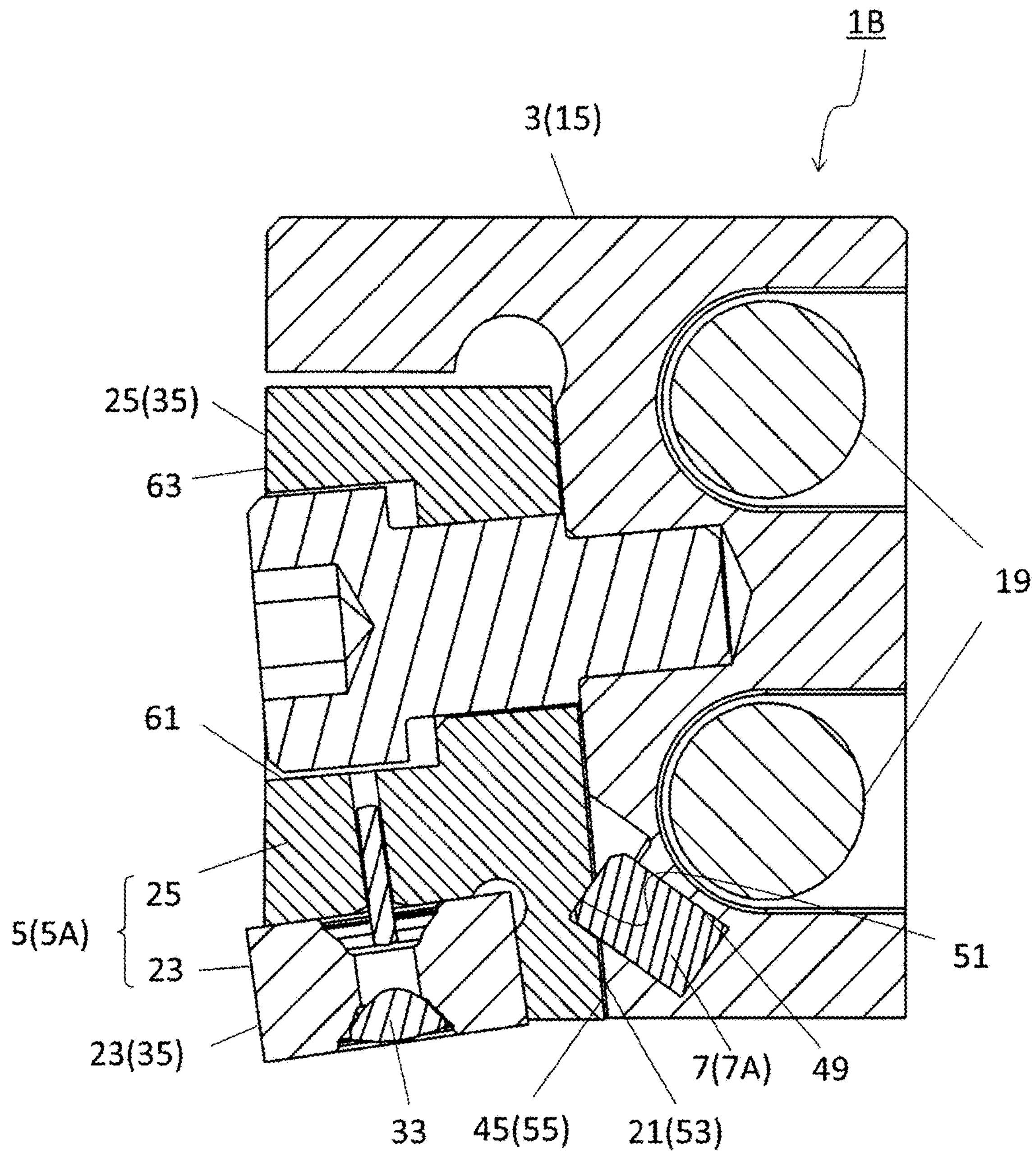
FIG. 16 is a sectional view which illustrates a body, a first cutting part, a fixture, etc. in a cutting tool in a second embodiment, and which corresponds to FIG. 10.
Figure 17:
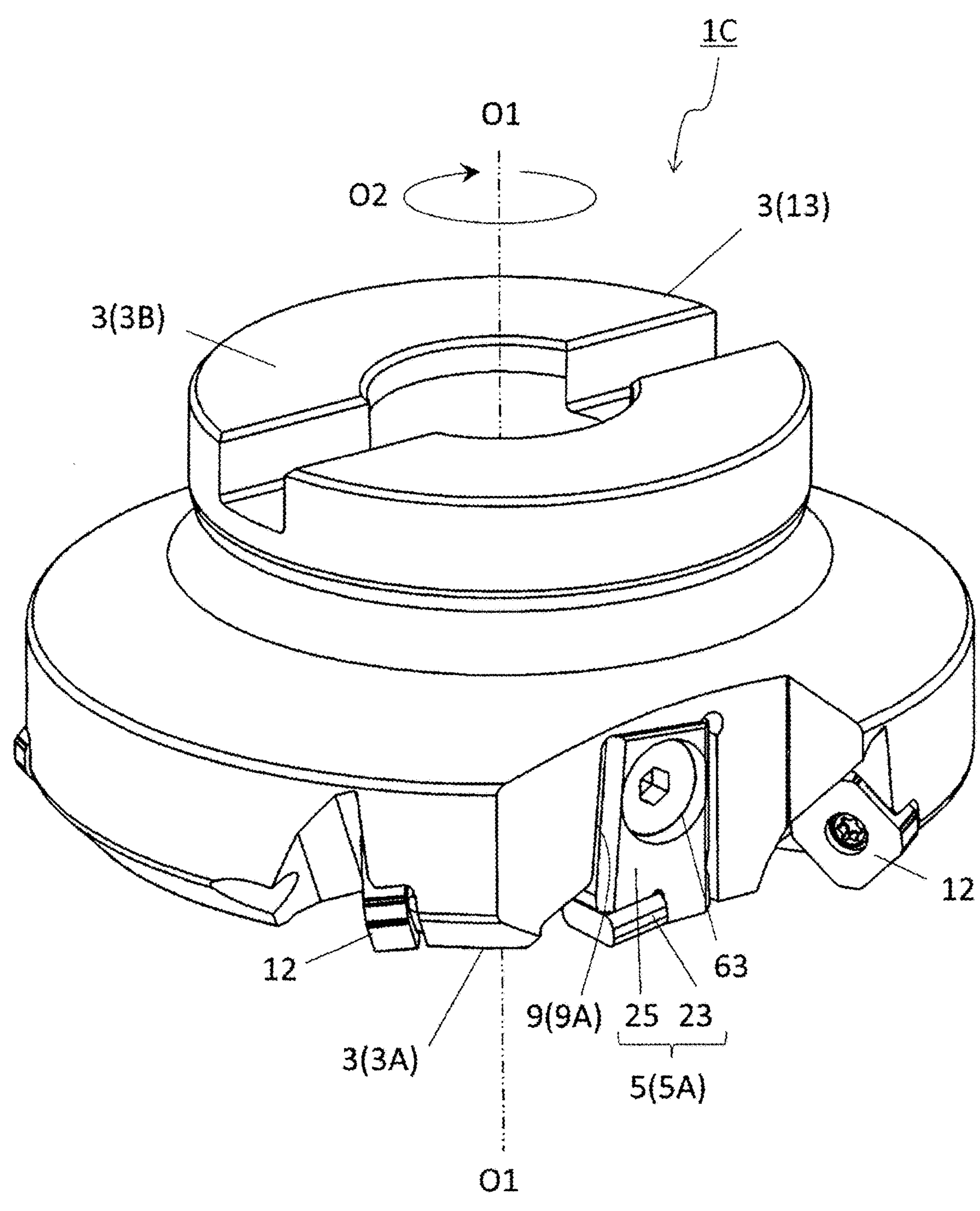
FIG. 17 is a perspective view illustrating a cutting tool in a third embodiment.
Figure 18:
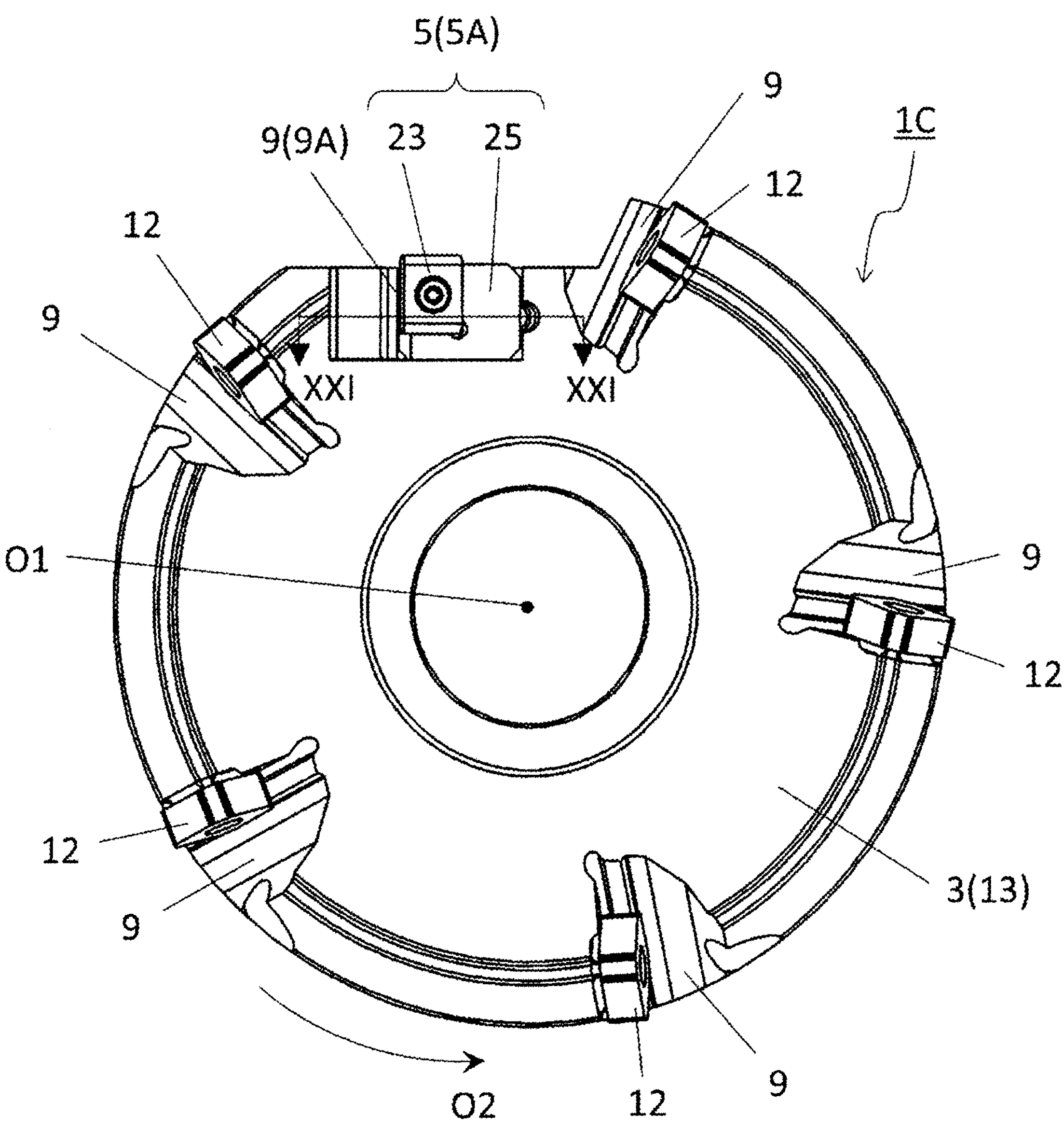
FIG. 18 is a plan view of the cutting tool illustrated in FIG. 17 as viewed from a side of a front end thereof.
Figure 19:
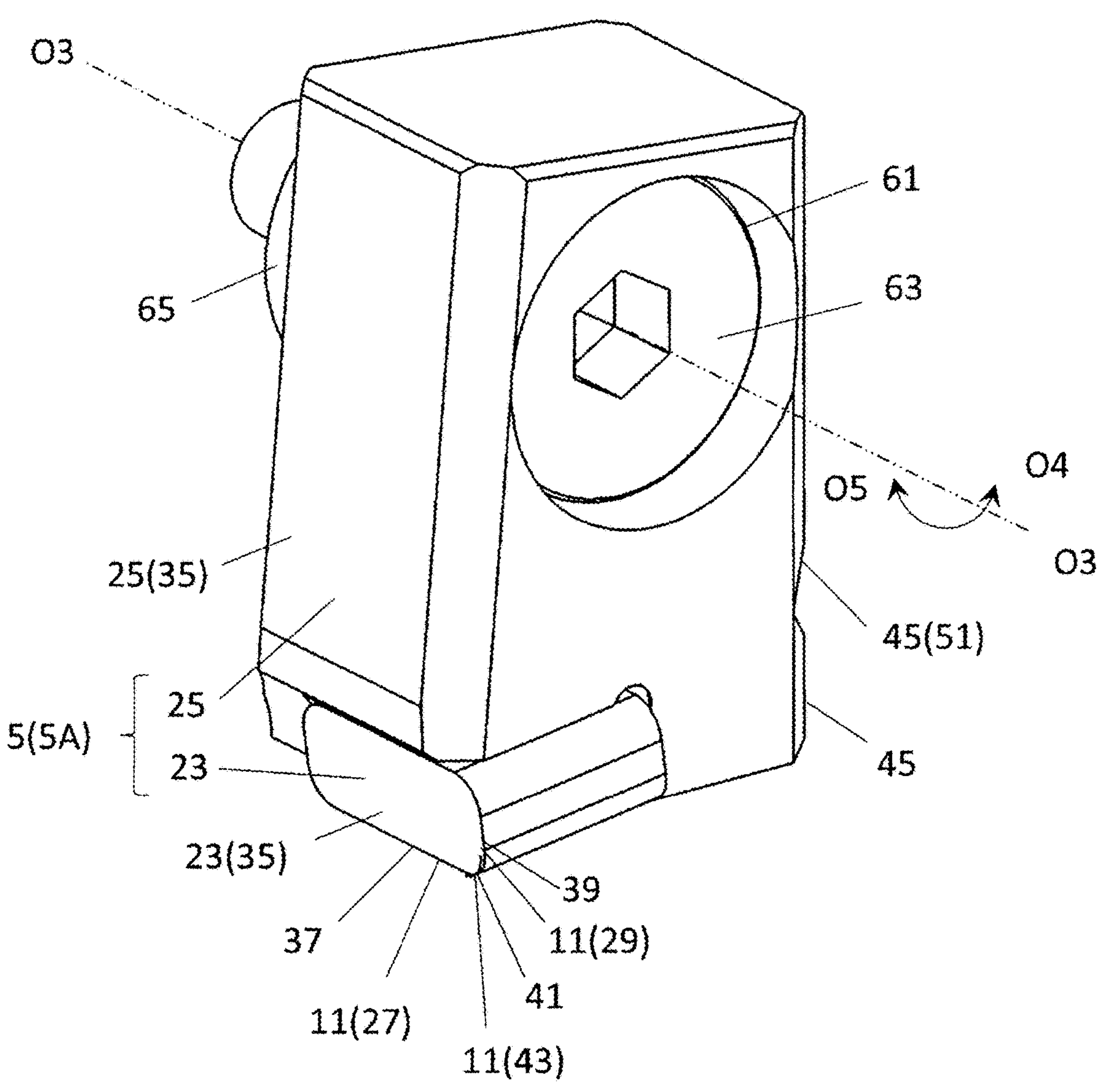
FIG. 19 is a perspective view illustrating a first cutting part, a fixture, a bearing member, etc. in the cutting tool illustrated in FIG. 17.

A cutting tool 1B in a second embodiment includes a body 3, a first cutting part 5A, and a first elastic body 7A. As to a component of the cutting tool 1B in the second embodiment which has the same configuration as that in the first cutting tool 1A of the first embodiment, a detailed description thereof is omitted here by referring to the description of the first embodiment. FIG. 16 illustrating the cutting tool 1B in the second embodiment is a drawing corresponding to FIG. 10.

Although the first elastic body 7A of the cutting tool 1A in the first embodiment is configured with the pin 47 and the helical spring 48, the first elastic body 7A of the cutting tool 1B in the second embodiment is composed of a member having a high Young's modulus.

The first elastic body 7A of the cutting tool 18 in the second embodiment is not limited to having a specific shape but may have, for example, a columnar shape as in a non-limiting embodiment illustrated in FIG. 16. An end surface of the first elastic body 7A having the columnar shape may have a polygonal shape or a circular shape.

Figure 20:
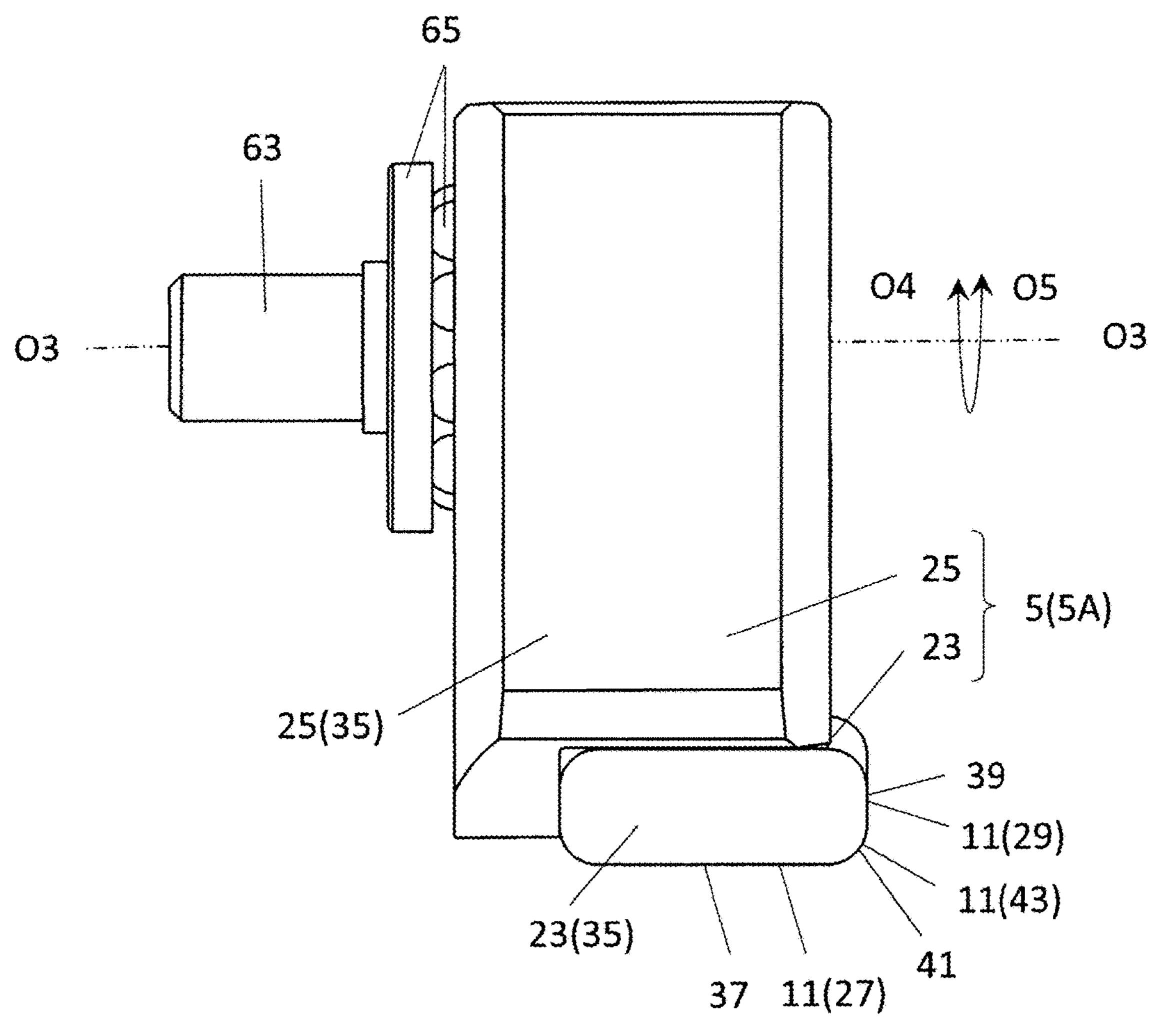
FIG. 20 is a plan view of a part illustrated in FIG. 19, which is a drawing corresponding to FIG. 6.
Figure 21:
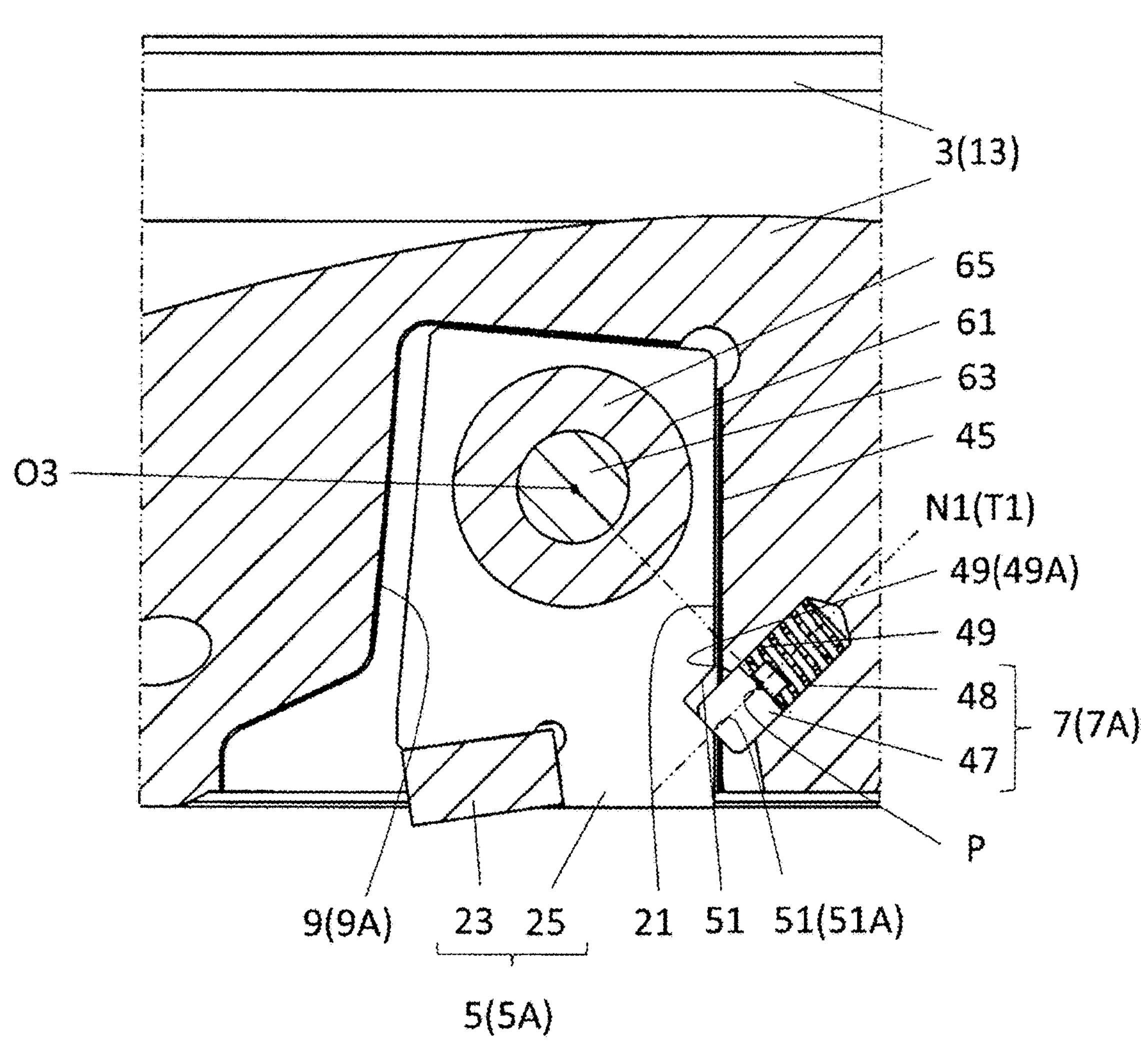
FIG. 21 is an enlarged view of a cross section taken along line XXI-XXI illustrated in FIG. 18.

A cutting tool 1C in a third embodiment includes a body 3, a first cutting part 5A, and a first elastic body 7A as in a non-limiting embodiment illustrated in FIGS. 17 to 23. As to a component of the cutting tool 1C in the third embodiment which has the same configuration as that in the first cutting tool 1A of the first embodiment, a detailed description thereof is omitted here by referring to the description of the first embodiment. FIG. 21 is an enlarged sectional view illustrating a state where the cutting tool 1C in the third embodiment is cut along line XXI-XXI in FIG. 18. A cross section along line XXI-XXI is a cross section that passes through a center of a second cartridge 25 and is parallel to a rotation axis O1.

Figure 27:
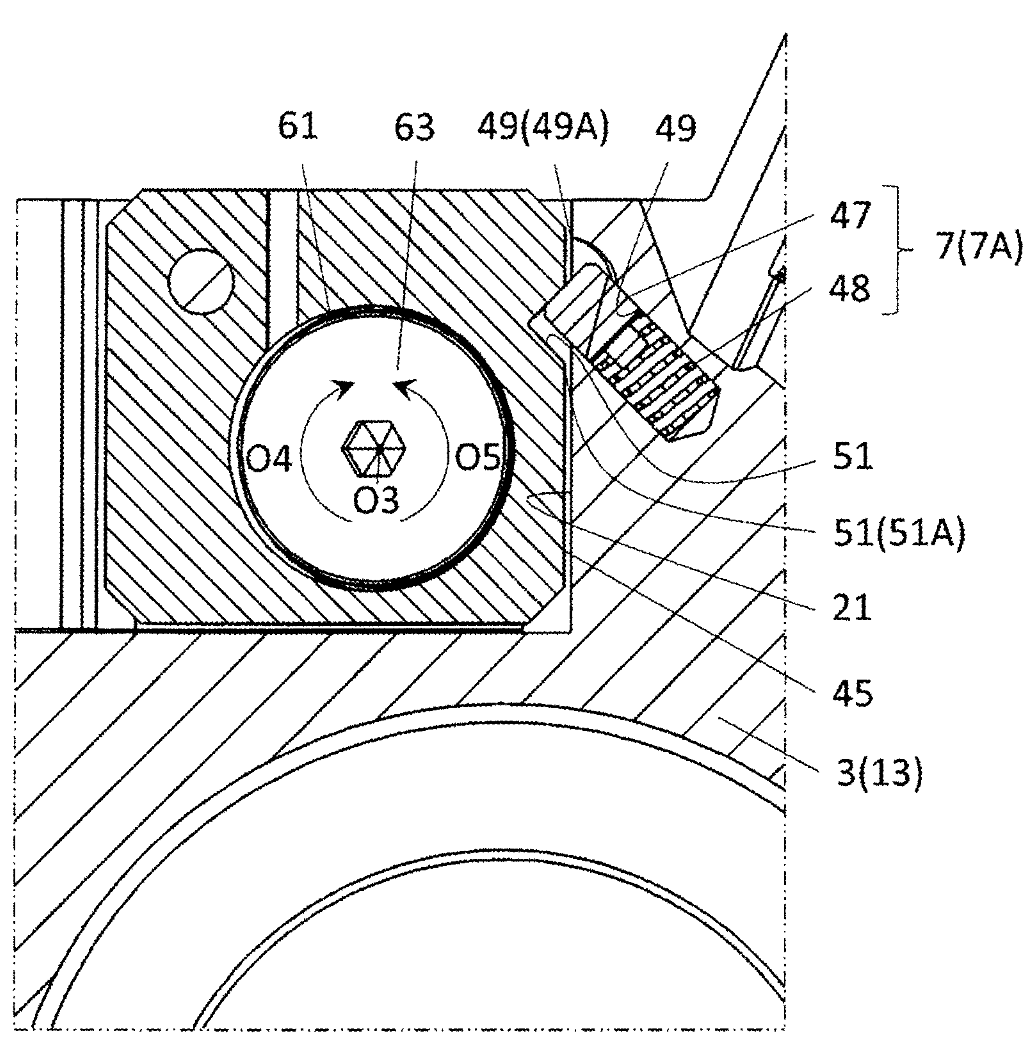
FIG. 27 is an enlarged view of a cross section taken along line XXVII-XXVII illustrated in FIG. 25.

A cutting tool 1D in a fourth embodiment includes a body 3, a first cutting part 5A, and a first elastic body 7A as in a non-limiting embodiment illustrated in FIGS. 24 to 29. As to a component of the cutting tool 1D in the fourth embodiment which has the same configuration as that in the first cutting tool 1A of the first embodiment, a detailed description thereof is omitted here by referring to the description of the first embodiment. FIG. 27 is an enlarged sectional view illustrating a state where the cutting tool 1D of the fourth embodiment is cut along line XXVII-XXVII in FIG. 25. A cross section along line XXVII-XXVII is a cross section that passes through a center of the first elastic body 7A and is orthogonal to a rotation axis O1.

The first cutting part 5A is linearly slidable by the presence of the flute (the first flute 53 or the second flute 57) in one of the first seating surface 21 and the rear surface 45 in the cutting tool 1A in the first embodiment. The cutting tool 1C in the third embodiment and the cutting tool 1D in the fourth embodiment are rotatable around the central axis (rotation axis O3) of a third fixture 63 as in the non-limiting embodiments illustrated in FIGS. 19 and 28. That is, the first cutting part 5A is slidable around the third fixture 63.

Figure 28:
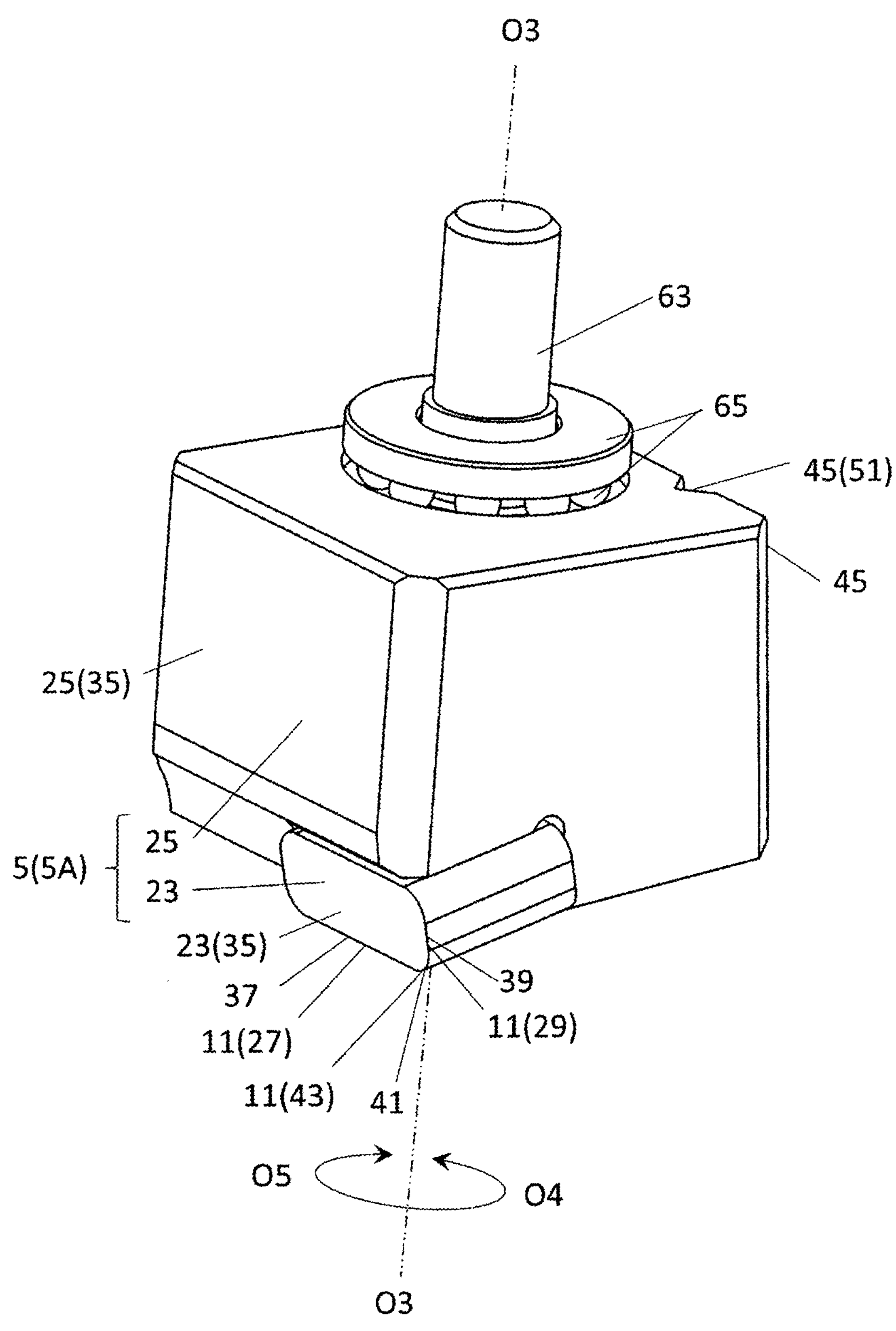
FIG. 28 is a perspective view illustrating a first cutting part, a fixture, a bearing member, etc. in the cutting tool illustrated in FIG. 24.

The cutting tool 1C and the cutting tool 1D may further include a bearing member 65 between the body 3 and the first cutting part 5A as in the non-limiting embodiments illustrated in FIGS. 20 and 28. In cases where the cutting tool 1C and the cutting tool 1D include this member, the first cutting part 5A is smoothly slidable around the third fixture 63.

The bearing member 65 may be located between the first through hole 61 and the third fixture 63. With the cutting tool 1C and the cutting tool 1D having the above configuration, the first cutting part 5A is smoothly slidable around the third fixture 63. The first through hole 61 in the cutting tool 1C may open into a surface on a side close to the rotation axis O1 and a surface on a side away from the rotation axis O1 in the first cutting part 5A as in the non-limiting embodiment illustrated in FIG. 19. The first through hole 61 in the cutting tool 1D may open into a surface on a side of the first end 3A and a surface on a side of the second end 3B in the first cutting part 5A as in the non-limiting embodiment illustrated in FIG. 28.

With the cutting tool 1C and the cutting tool 1D, during machining, the first cutting part 5A may rotate in a rotation direction O4 of the rotation axis O3, and the first cutting edge 27 may move to the first cutting edge position S1. During non-machining, the first cutting part 5A may rotate in a rotation direction O5 of the rotation axis O3, and the first cutting edge 27 may move to the second cutting edge position S2. The second cutting edge position S2 may be located closer to the second end 3B than the first cutting edge position S1 in the direction along the rotation axis O1. A distance (δZ) between the first cutting edge position S1 and the second cutting edge position S2 in the direction along the rotation axis O1 is, for example, 0.05-0.2 mm. The rotation direction O4 and the rotation direction O5 show a reverse directional relationship in the rotation direction of the rotation axis O3 as in the non-limiting embodiment illustrated in FIGS. 23 and 27. A solid line indicates the cutting tool 1C during machining, and a dotted line indicates the cutting tool 1C during non-machining in FIG. 23.

Because the first cutting part 5A linearly slides in the direction along the rotation axis O1 in the cutting tool 1A in the first embodiment, the central axis N1 of the first elastic body 7A may extend in the direction along the rotation axis O1 as in the non-limiting embodiment illustrated in FIG. 11. Because the first cutting part 5A slides around the third fixture 63 in the cutting tool 1D in the third embodiment and the cutting tool 1D in the fourth embodiment, the central axis N1 of the first elastic body 7A may extend in a direction vertical to a straight line connecting the rotation axis O3 and the first elastic body 7A (a direction of a tangent line T1) in a cross section vertical to the rotation axis O3. At this point, an intersection P of the straight line connecting the rotation axis O3 and the first elastic body 7A and the tangent line T1 may be present on the first elastic body 7A as in a non-limiting embodiment illustrated in FIG. 21. With the cutting tool 1C and the cutting tool 1D having the above configuration, the first elastic body 7A is capable of efficiently applying the urging force to the first cutting part 5A. The central axis N1 of the first elastic body 7A may coincide with the tangent line T1 as in the non-limiting embodiment illustrated in FIG. 21.

Figure 22:
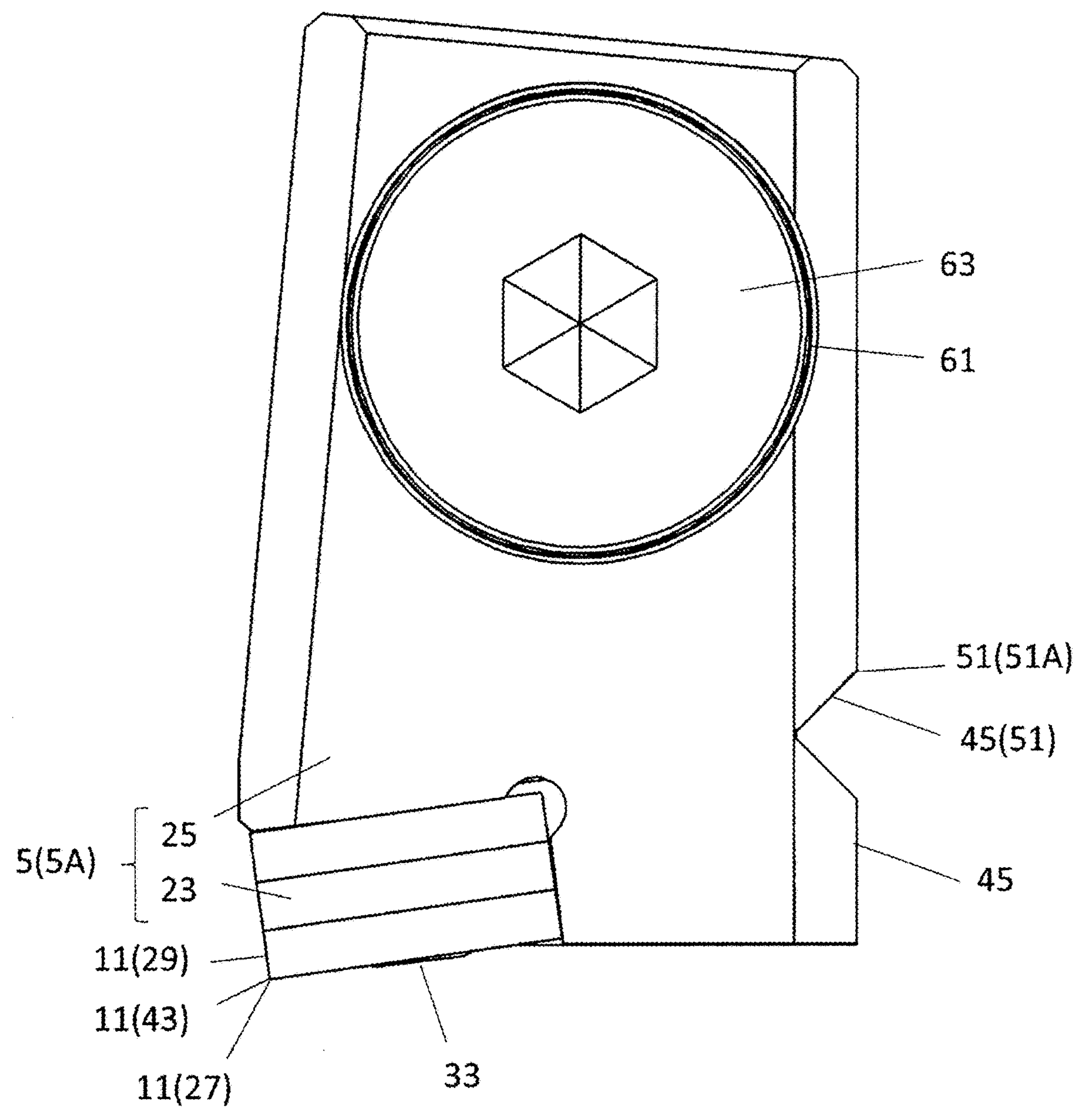
FIG. 22 is a plan view of the part illustrated in FIG. 19, which is a drawing corresponding to FIG. 5.
Figure 23:
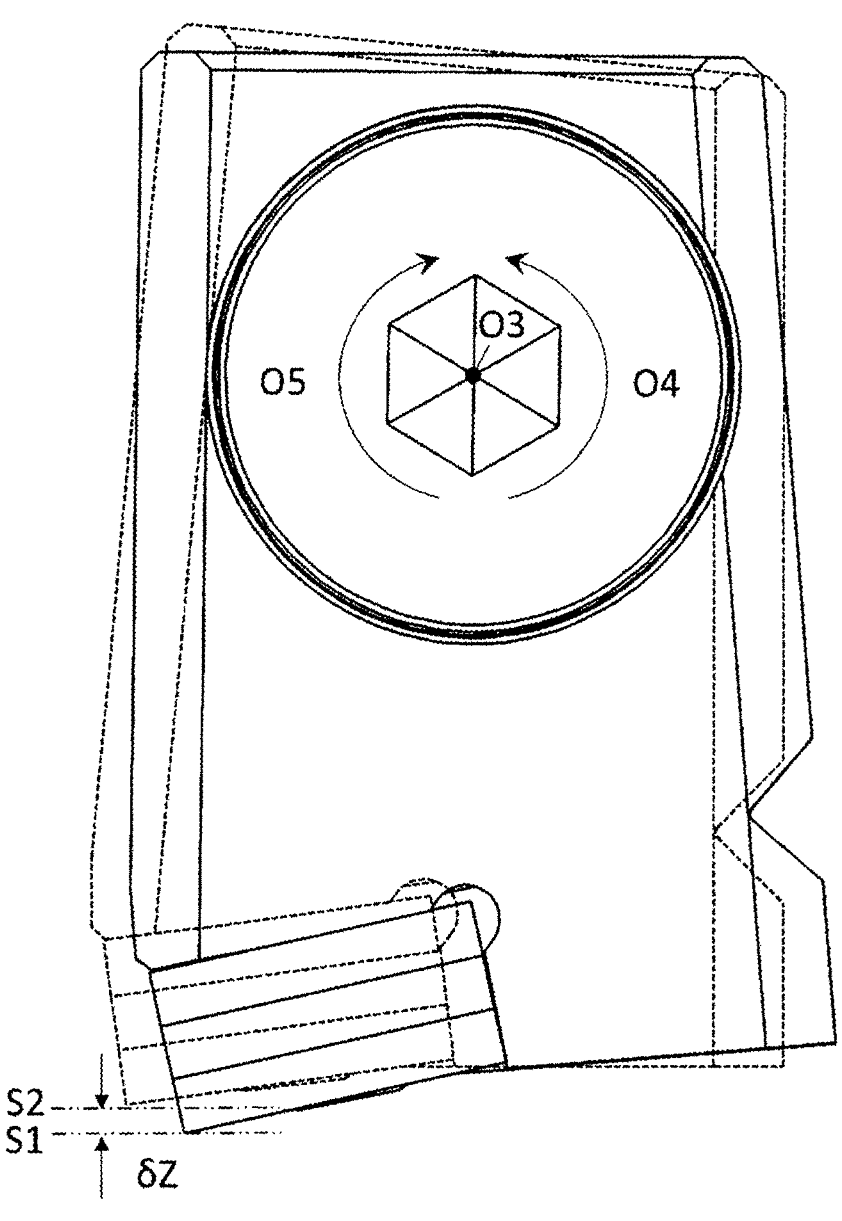
FIG. 23 is a schematic diagram illustrating a positional relationship during machining and during non-machining in a part illustrated in FIG. 22.
Figure 24:
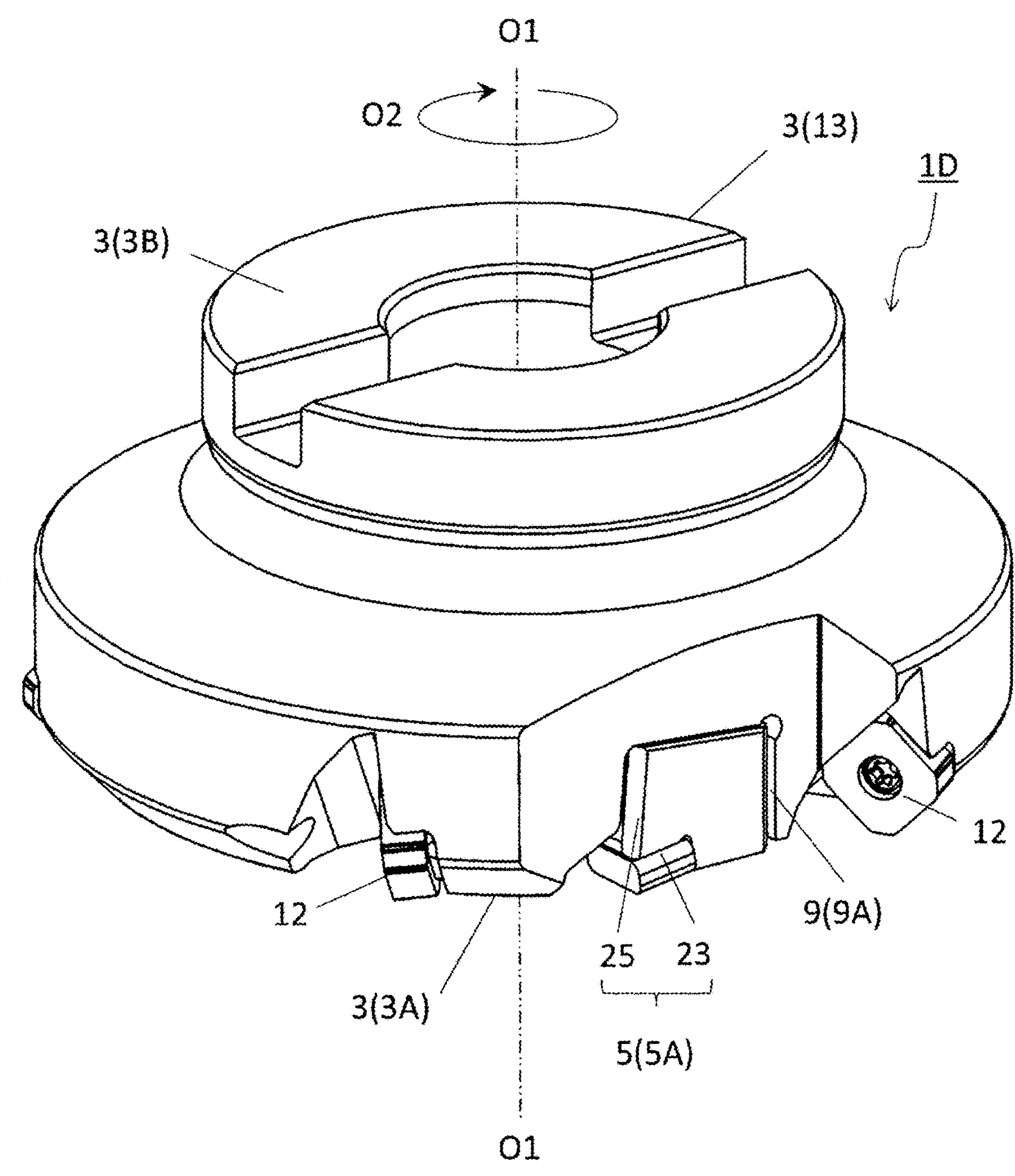
FIG. 24 is a perspective view illustrating a cutting tool in a fourth embodiment.
Figure 25:
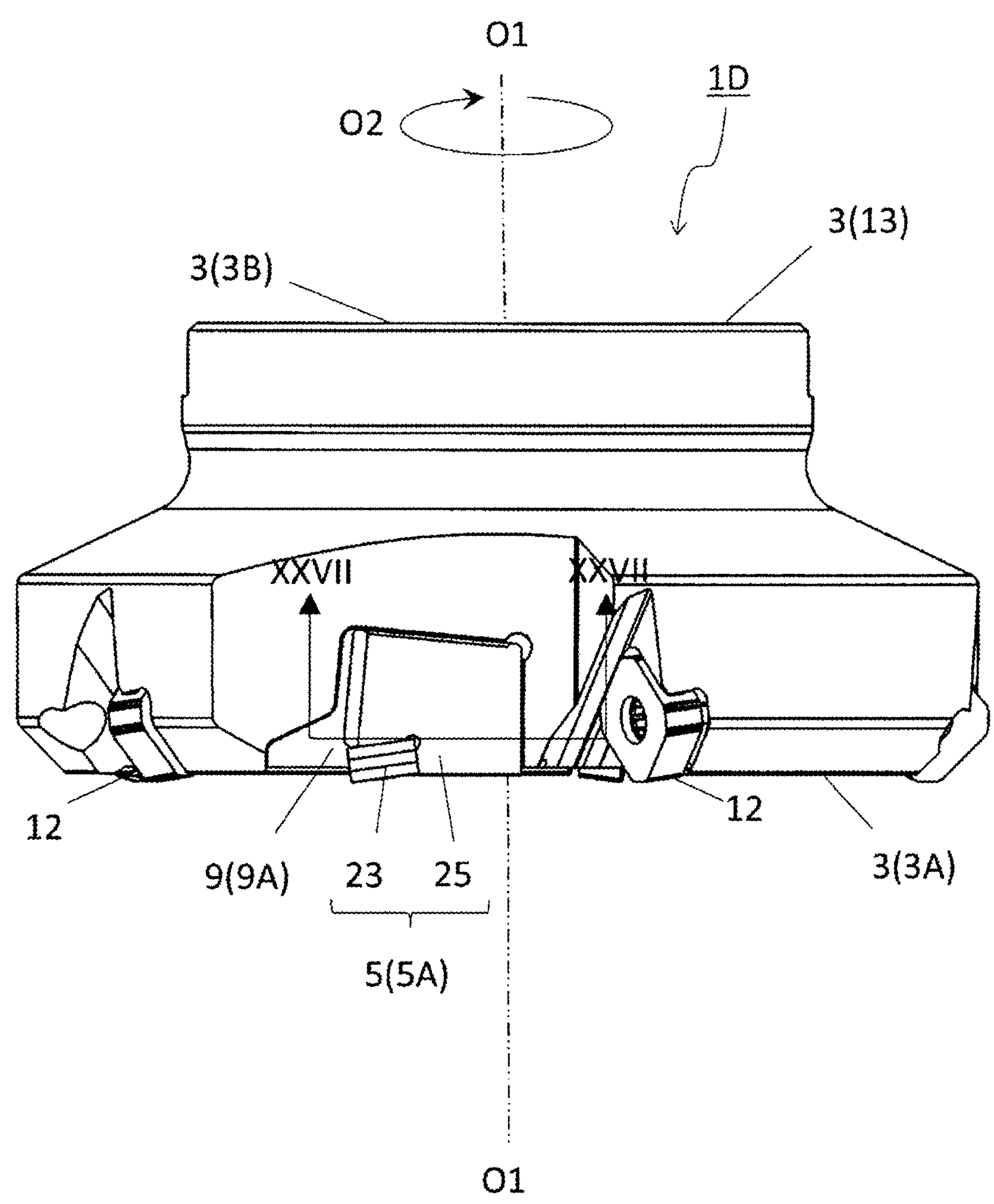
FIG. 25 is a plan view of the cutting tool illustrated in FIG. 24.
Figure 26:
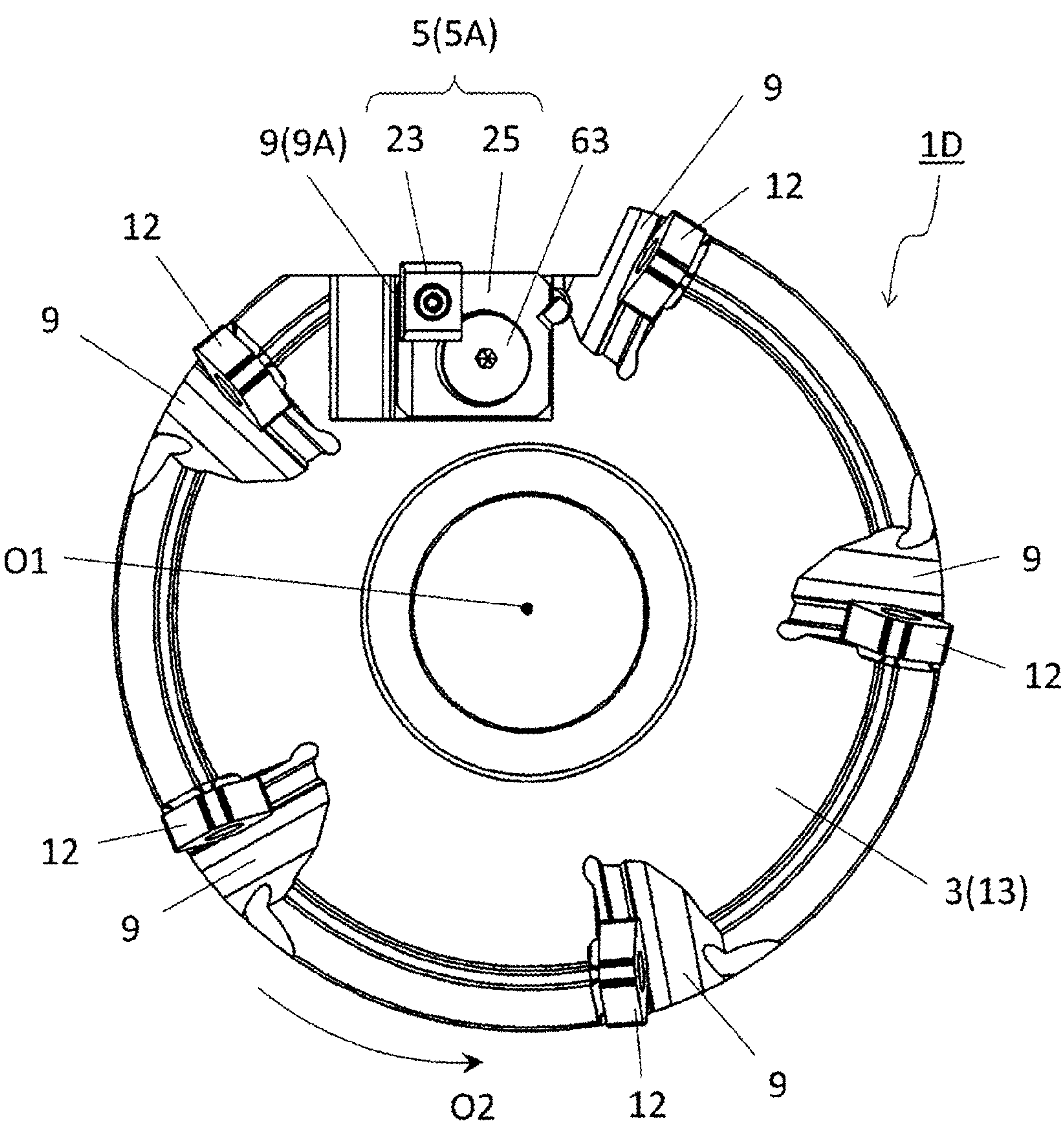
FIG. 26 is a plan view of the cutting tool illustrated in FIG. 24 as viewed from a side of a front end thereof.

In a side view of the cutting tool 1C in the third embodiment, the first cutting edge 27 may be located on a front side in the rotation direction O2 of the rotation axis O1 than the rotation axis O3 as in the non-limiting embodiment illustrated in FIG. 22. With the cutting tool 1C having this configuration, the first cutting edge 27 can easily move toward the first end 3A during machining. That is, the first cutting edge position S1 can easily be located on a side of the first end 3A than the second cutting edge position S2 in the direction along the rotation axis O1.

Figure 29:
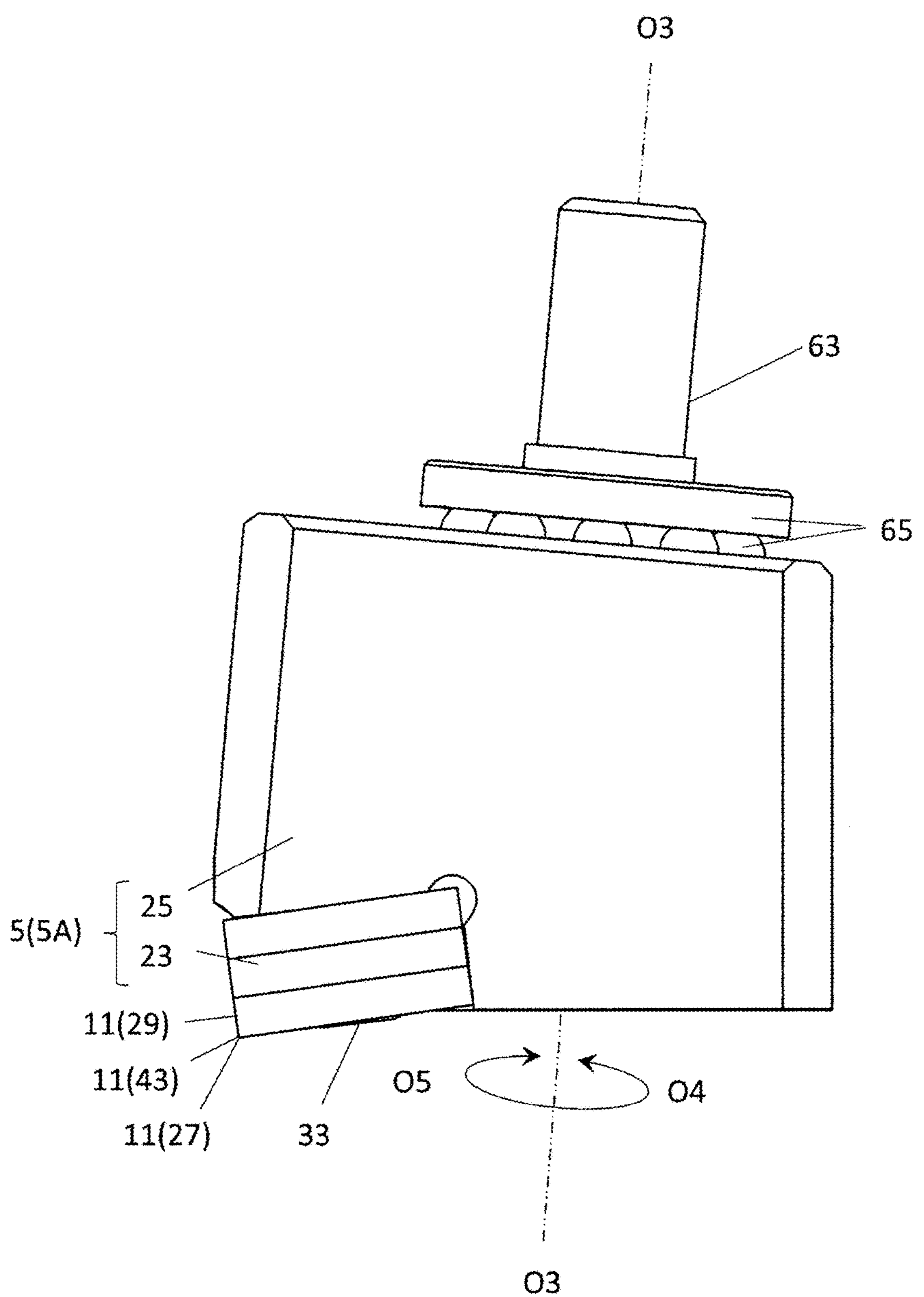
FIG. 29 is a plan view of a part illustrated in FIG. 28, which is a drawing corresponding to FIG. 5.

In a side view of the cutting tool 1D in the fourth embodiment, the first cutting edge 27 may be located on a front side in the rotation direction O2 of the rotation axis O1 than the rotation axis O3 as in a non-limiting embodiment illustrated in FIG. 29. With the cutting tool 1D having this configuration, the cutting edge 11 moves in the rotation direction O5 during machining. That is, the cutting edge 11 moves toward the first end 3A and moves in a direction away from the rotation axis O1. Therefore, it is possible to enhance the feed rate in the milling process in the case of including, for example, the second cutting edge 29.

The third fixture 63 in the fourth embodiment may be inclined toward the rear side in the rotation direction O2 of the rotation axis O1 as coming closer to the second end 3B in the direction along the rotation axis O1. In other words, the central axis (rotation axis O3) of the third fixture 63 may be inclined so as to come closer to the rear side in the rotation direction O2 of the rotation axis O1 as coming closer to the second end 3B in the direction along the rotation axis O1. The first through hole 61 and the bearing member 65 may also be inclined so as to come closer to the rear side in the rotation direction O2 of the rotation axis O1 as coming closer to the second end 3B in the direction along the rotation axis O1. With the cutting tool 1D having this configuration, the first cutting edge 27 can easily move toward the first end 3A during machining.

For example, cemented carbide and cermet are usable as a material of the cutting insert 12 and the first insert 23. Examples of composition of the cemented carbide may include WC—Co, WC—TiC—Co and WC—TiC—TaC—Co. WC—Co is produced by adding cobalt (Co) to tungsten carbide (WC), followed by sintering. WC—TiC—Co is obtained by adding titanium carbide (TiC) to WC—CO. WC—TiC—TaC—Co is obtained by adding tantalum carbide (TaC) to WC—TiC—Co.

The cermet is a sintered composite material obtained by compositing metal into a ceramic component. Specific examples of the cermet may include those composed mainly of titanium compounds, such as titanium carbide (TiC) and titanium nitride (TiN).

A surface of the cutting insert 12 and the first insert 23 may be coated with a coating film by using chemical vapor deposition (CVD) method or physical vapor deposition (PVD) method. Examples of composition of the coating film may include titanium carbide (TiC), titanium nitride (TiN), titanium carbonitride (TiCN), and alumina ($Al_2O_3$).

For example, steel, cast iron and aluminum alloy are usable as material of the base 13. From the viewpoint of enhancing toughness, steel may be used as the material of the base 13.

The cutting tools 1A to 1D of the present disclosure include the body 3, the cutting part 5, and an urging means. The urging means is located between the body 3 and the first cutting part 5A, and is an element capable of applying an urging force directed toward the second end 3B to the first cutting part 5A. The urging means may be located between the first seating surface 21 and the rear surface 45. Examples of specific configurations of the urging means may include the first elastic body 7A described above. The urging means is not limited to these configurations but may be those using, for example, air pressure, liquid pressure, magnetic force, etc.

In the cutting tools 1A to 1D of the present disclosure, the first cutting part 5A is slidable toward the second end 3B by the urging force applied from the urging means, namely the first elastic body 7A. Hence, the first cutting part 5A is slidable toward the second end 3B when the first cutting part 5A is located on a rear side in the feed direction Y1 with respect to the rotation axis as compared with when the first cutting part 5A is located on a front side in the feed direction Y1 with respect to the rotation axis. That is, the urging force is applied from the urging means to the first cutting part 5A so that the position of the cutting edge 11 during non-machining can come closer to the second end 3B than the position of the cutting edge 11 during machining.

With the configuration that the urging force is thus applied from the urging means to the first cutting part 5A, a workpiece can be subjected to a machining process by the first cutting part 5A when the first cutting part 5A is located on the front side in the feed direction Y1 with respect to the rotation axis, whereas the workpiece is hardly subjected to the machining process by the first cutting part 5A when the first cutting part 5A is located on the rear side in the feed direction Y1 with respect to the rotation axis. Therefore, it is possible to reduce the risk of the crossed line pattern.

<Method for Manufacturing Machined Product>

Figure 31:
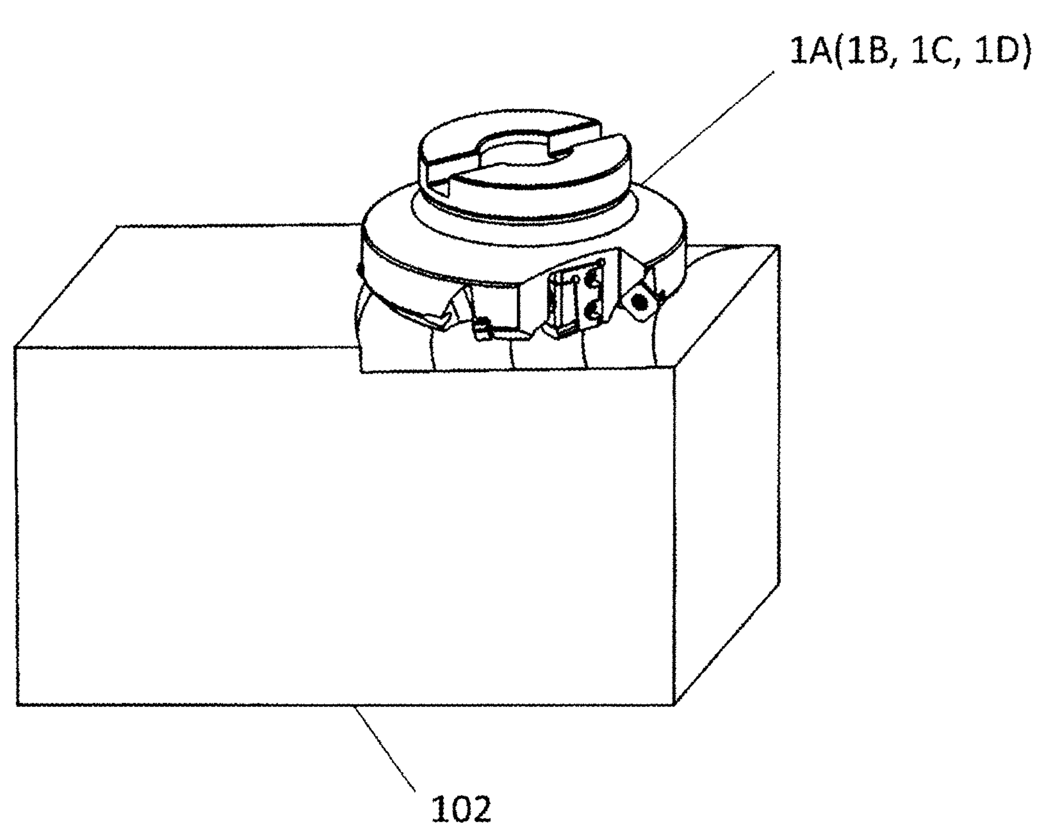
FIG. 31 is a schematic explanatory diagram illustrating one of the steps in the method for manufacturing a machined product in one embodiment.
Figure 32:
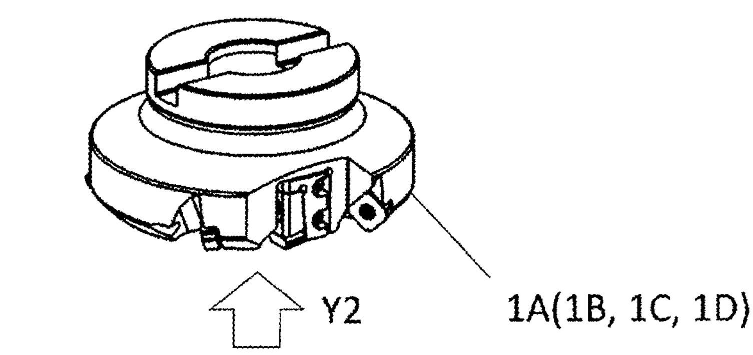
FIG. 32 is a schematic explanatory diagram illustrating one of the steps in the method for manufacturing a machined product in one embodiment.
Figure 32:
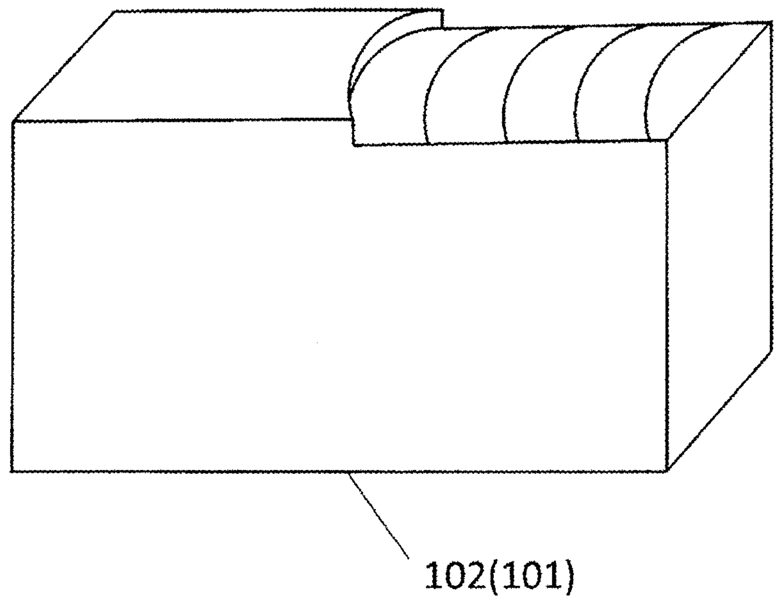

A method for manufacturing a machined product in a non-limiting embodiment of the present disclosure is described in detail below by exemplifying the case of using the cutting tool 1A in the non-limiting first embodiment with reference to FIGS. 30 to 32. FIGS. 30 to 32 illustrate the steps of a machining process of a workpiece 102 as a non-limiting embodiment of the method for manufacturing the machined product 101. In order to facilitate visual understanding, hatching is applied to a cut part in FIGS. 31 and 32.

The method for manufacturing the machined product 101 in the non-limiting embodiment of the present disclosure may include the following steps (1) to (3).

(1) The cutting tool 1A may be brought near the workpiece 102 in a feed direction Y1 by rotating the cutting tool 1A in a rotation direction O2 around a rotation axis O1 (refer to FIG. 30).

This step can be carried out, for example, by fixing the workpiece 102 onto a table of a machine tool with the cutting tool 1A attached thereto, and by bringing the cutting tool 1A being rotated near the workpiece 102. However, in this step, the workpiece 102 and the cutting tool 1A may be brought near each other, and the workpiece 102 may be brought near the cutting tool 1A.

(2) The cutting tool 1A being rotated may be brought into contact with a desired position on a surface of the workpiece 102 so as to cut out the workpiece 102 by causing the cutting tool 1A to come closer to the workpiece 102 (refer to FIG. 31).

In this step, the cutting edge 11 may be brought into contact with the desired position on the surface of the workpiece 102.

(3) The cutting tool 1A may be moved away from the workpiece 102 in Y2 direction (refer to FIG. 32).

Also in this step, similarly to the above step (1), the cutting tool 1A may be relatively moved away from the workpiece 102. For example, the workpiece 102 may be moved away from the cutting tool 1A. Examples of the machining process may include plunge milling, profile milling, and ramping process, in addition to the milling process as in the non-limiting embodiment illustrated in FIG. 32.

It is possible to offer excellent machinability by going through the foregoing steps.

In cases where the machining process of the workpiece 102 as described above is carried out a plurality of times, specifically, a plurality of machining processes of a single workpiece 102 are carried out, the step of bringing the cutting tool 1A into contact with different portions of the workpiece 102 may be repeated while keeping the cutting tool 1A rotated.

Examples of material of the workpiece 102 may include carbon steel, alloy steel, stainless steel, cast iron, and nonferrous metals.

DESCRIPTION OF THE REFERENCE NUMERAL

1A to 1D cutting tool
O1, O3 rotation axis
O2, O4, O5 rotation direction
3 body
3A front end (first end)
3B rear end (second end)
5 cutting part
5A first cutting part
7 elastic body
7A first elastic body
9 pocket
9A first pocket
11 cutting edge
12 cutting insert
13 base
15 first cartridge
17 first hole
19 first fixture
21 first seating surface
23 first insert
25 second cartridge
27 first cutting edge
29 second cutting edge
31 second hole
33 second fixture
35 front surface
37 first side

39 second side
41 first corner
43 third cutting edge
45 rear surface
N1, N2 central axis
Y1 feed direction
S1 first cutting edge position
S2 second cutting edge position
47 pin
48 helical spring
49 first concave part
49A opening part
51 second concave part
51A opening part
53 first flute
55 first convex part
57 second flute
59 second convex part
61 first through hole
63 third fixture
64 third concave part
65 bearing member
T1 tangent line
P intersection
101 machined product
102 workpiece

The invention claimed is:

1. A cutting tool, comprising:

a body which extends from a front end toward a rear end along a rotation axis and comprises a pocket located on a side of the front end;

a plurality of cutting inserts, at an outer periphery of the body, configured to perform a machining process on a workpiece;

a cutting part which is located in the pocket and comprises a cutting edge located on the side of the front end; and an elastic body which is located between the body and the cutting part and configured to apply an urging force, in a direction toward the rear end, to the cutting part, wherein the pocket comprises a first seating surface directed to a front side in a rotation direction of the rotation axis, the cutting part comprises a rear surface which is located on a rear side in the rotation direction of the rotation axis and which is in contact with the first seating surface, the elastic body is in contact with the first seating surface and the rear surface, the rear surface is slidable toward the rear end, and in a radial direction of the rotation axis, the cutting part is located closer to a center of the cutting tool than the plurality of cutting inserts is to the center of the cutting tool, and configured to perform a further machining process on the workpiece.

2. The cutting tool according to claim 1, wherein the first seating surface is inclined to the front side in the rotation direction as extending toward the rear end.

3. The cutting tool according to claim 1, wherein the first seating surface comprises a first concave part, the rear surface comprises a second concave part opposed to the first concave part, and the elastic body is in contact with the first concave part and the second concave part.

4. The cutting tool according to claim 1, wherein the first seating surface comprises a first flute extending from the side of the front end toward a side of the rear end, and the rear surface comprises a first convex part inserted into the first flute.

5. The cutting tool according to claim 4, wherein the first flute extends toward a center of the rotation axis as extending toward the rear end.

6. The cutting tool according to claim 4, wherein the elastic body is located closer to a center of the rotation axis than the first flute.

7. The cutting tool according to claim 1, wherein the rear surface comprises a second flute extending from a side of the front end toward a side of the rear end, and the first seating surface comprises a second convex part inserted into the second flute.

8. The cutting tool according to claim 7, wherein the second flute extends toward a center of the rotation axis as extending toward the rear end.

9. The cutting tool according to claim 1, wherein the cutting part further comprises a front surface located on the front side in the rotation direction, a through hole opening in the front surface and the rear surface, and a fixture inserted into the through hole and fixed to the body.

10. A cutting tool, comprising:

a body which extends from a front end toward a rear end along a rotation axis and comprises a pocket located on a side of the front end;

a plurality of cutting inserts, at an outer periphery of the body, configured to perform a machining process on a workpiece;

a cutting part which is located in the pocket and comprises a cutting edge located on the side of the front end; and an urging means located between the body and the cutting part, and configured to apply an urging force to the cutting part so that a position of the cutting edge not in contact with a workpiece comes closer to the rear end than a position of the cutting edge in contact with the workpiece, wherein in a radial direction of the rotation axis, the cutting part is located closer to a center of the cutting tool than the plurality of cutting inserts is to the center of the cutting tool, and configured to perform a further machining process on the workpiece.

11. A method for manufacturing a machined product, the method comprising:

rotating a cutting tool;

bringing the cutting tool into contact with a workpiece; and moving the cutting tool away from the workpiece, wherein the cutting tool comprises a body which extends from a front end toward a rear end along a rotation axis and comprises a pocket located on a side of the front end;

a plurality of cutting inserts, at an outer periphery of the body, configured to perform a machining process on the workpiece;

a cutting part which is located in the pocket and comprises a cutting edge located on the side of the front end; and an elastic body which is located between the body and the cutting part and configured to apply an urging force in a direction toward the rear end to the cutting part, the pocket comprises a first seating surface directed to a front side in a rotation direction of the rotation axis, the cutting part comprises a rear surface which is located on a rear side in the rotation direction of the rotation axis and which is in contact with the first seating surface, the elastic body is in contact with the first seating surface and the rear surface, the rear surface is slidable toward the rear end, and in a radial direction of the rotation axis, the cutting part is located closer to a center of the cutting tool than the plurality of cutting inserts is to the center of the cutting tool, and configured to perform a further machining process on the workpiece.

* * * * *